(12) United States Patent
Kaehr et al.

(10) Patent No.: US 8,061,249 B1
(45) Date of Patent: Nov. 22, 2011

(54) PIPE CUTTING APPARATUS AND METHOD

(76) Inventors: Lyle D. Kaehr, Decatur, IN (US); James A. Kaehr, Lagro, IN (US)

( * ) Notice: Subject to any disclaimer, the term of this patent is extended or adjusted under 35 U.S.C. 154(b) by 0 days.

(21) Appl. No.: 12/589,761

(22) Filed: Oct. 28, 2009

Related U.S. Application Data

(62) Division of application No. 11/196,177, filed on Aug. 3, 2005, now Pat. No. 7,624,663.

(51) Int. Cl.
*B26D 3/16* (2006.01)
*B26D 3/00* (2006.01)

(52) U.S. Cl. ............ 83/456; 83/168.7; 83/648; 83/657; 30/96; 30/101; 30/102

(58) Field of Classification Search ............... 83/13, 456, 83/657, 54, 452, 462, 466, 468.7, 648; 30/102, 30/92, 97, 95, 96, 101, 372, 371; 409/179, 409/180, 183, 199, 200, 204, 209; 82/46, 82/70.2, 7.8, 83, 92, 38, 39; 241/541.14, 241/542, 547; 269/239
See application file for complete search history.

(56) References Cited

U.S. PATENT DOCUMENTS

| | | | |
|---|---|---|---|
| 1,130,395 A | | 3/1915 | Gilmore |
| 1,728,504 A | * | 9/1929 | Nonneman ............... 30/102 |
| 1,850,327 A | | 3/1932 | Makowski |
| 1,990,310 A | | 2/1935 | Rosenberg et al. |
| 2,817,898 A | * | 12/1957 | Vermette ............... 30/102 |
| 2,842,238 A | | 7/1958 | Shaw et al. |
| 2,870,536 A | | 1/1959 | Lutsker |
| 2,961,765 A | | 11/1960 | Brooks |
| 3,431,646 A | | 3/1969 | Young |
| 3,507,035 A | | 4/1970 | Mann, Jr. |
| 3,579,826 A | | 5/1971 | Morain |
| 3,603,182 A | | 9/1971 | Jackman et al. |
| 3,820,424 A | * | 6/1974 | George, Jr. ............... 82/101 |
| 3,875,831 A | | 4/1975 | Beauloye |
| 3,923,443 A | | 12/1975 | Emery et al. |
| 3,932,937 A | * | 1/1976 | Bastiansen ............... 30/102 |
| 3,985,051 A | * | 10/1976 | Brown ............... 82/101 |
| 3,986,543 A | | 10/1976 | Slayton et al. |
| 4,114,485 A | | 9/1978 | Coblitz et al. |
| 4,180,358 A | | 12/1979 | Uribe |
| 4,490,909 A | | 1/1985 | Wachs et al. |
| 4,625,464 A | | 12/1986 | Kubo |
| 4,633,621 A | | 1/1987 | Weber |
| 4,641,562 A | | 2/1987 | Clarke |
| 4,682,919 A | | 7/1987 | Mitchell |
| 4,689,883 A | | 9/1987 | Dent |
| 5,020,221 A | | 6/1991 | Nelson |

(Continued)

*Primary Examiner* — Ghassem Alie
(74) *Attorney, Agent, or Firm* — George Pappas

(57) ABSTRACT

A pipe cutting apparatus having a frame and first and second pipe support arms. The pipe support arms are pivotally attached to the frame. First and second pipe support members on the first and second arms together with a third pipe support member securely grip the pipe at substantially equally circumferentially spaced locations. A camming member is used to place the first and second pipe support arms in predefined locations for holding differently sized pipes. An linkage assembly causes the third pipe support member to biasingly engage the pipe. A two-part tool shield is provided together with a depth adjusting assembly for facilitating the cutting and beveling of the pipe. A power transmission assembly transfers power from a motor on the frame to a tool located on a pivoting arm. The frame may be manufactured using an adhesive filler material for enhancing the rigidity, strength and accuracy of the components.

17 Claims, 15 Drawing Sheets

U.S. PATENT DOCUMENTS

| | | |
|---|---|---|
| 5,148,587 A | 9/1992 | Phelps et al. |
| 5,285,576 A * | 2/1994 | Taylor .............................. 30/94 |
| 5,894,772 A | 4/1999 | Nodar |
| 6,079,302 A | 6/2000 | Gudleske |
| 6,129,488 A | 10/2000 | Fahr |
| 6,658,739 B1 | 12/2003 | Huang |
| 6,666,062 B2 | 12/2003 | Dole et al. |
| 2005/0022353 A1 | 2/2005 | Viola et al. |

* cited by examiner

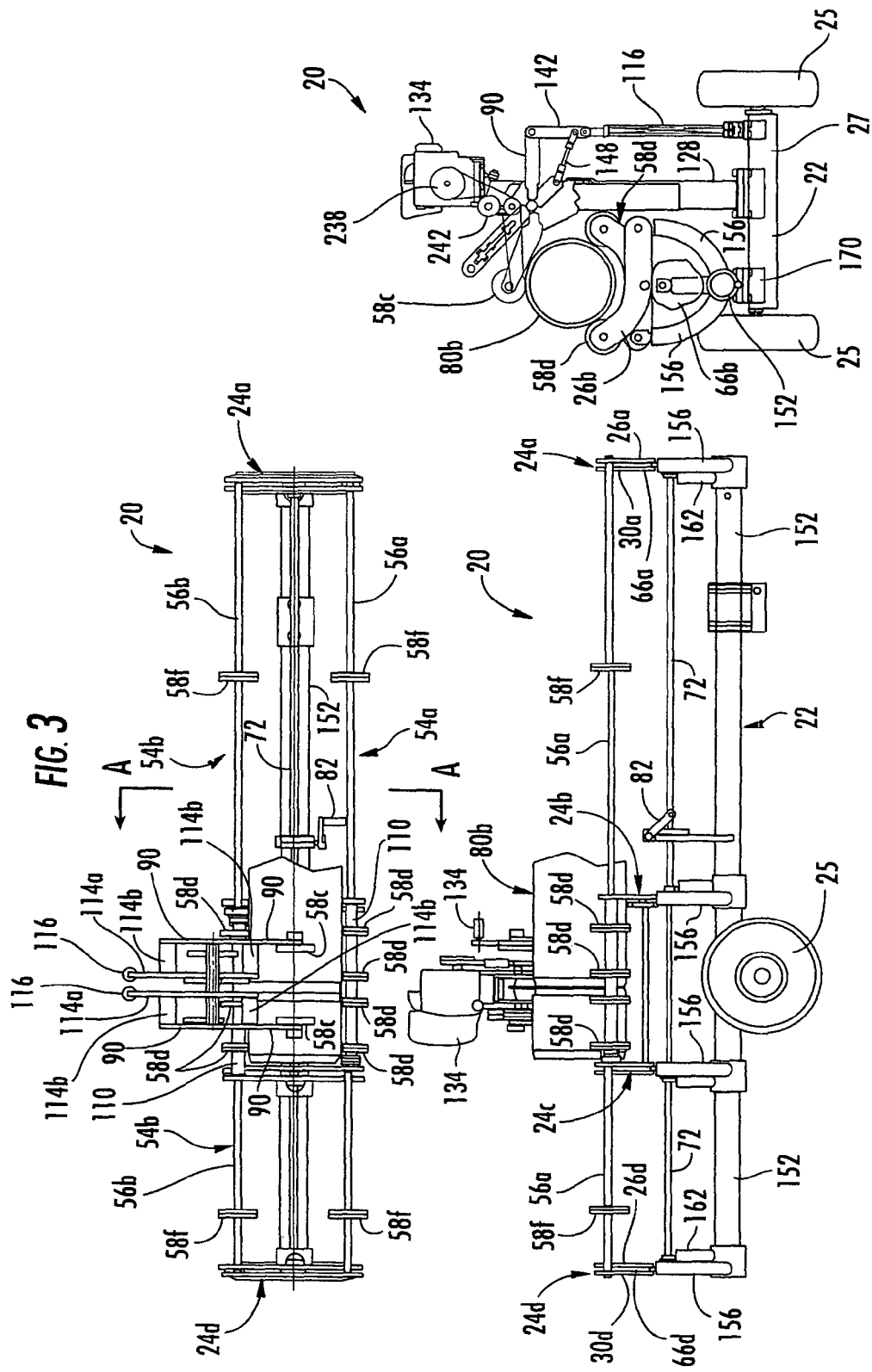

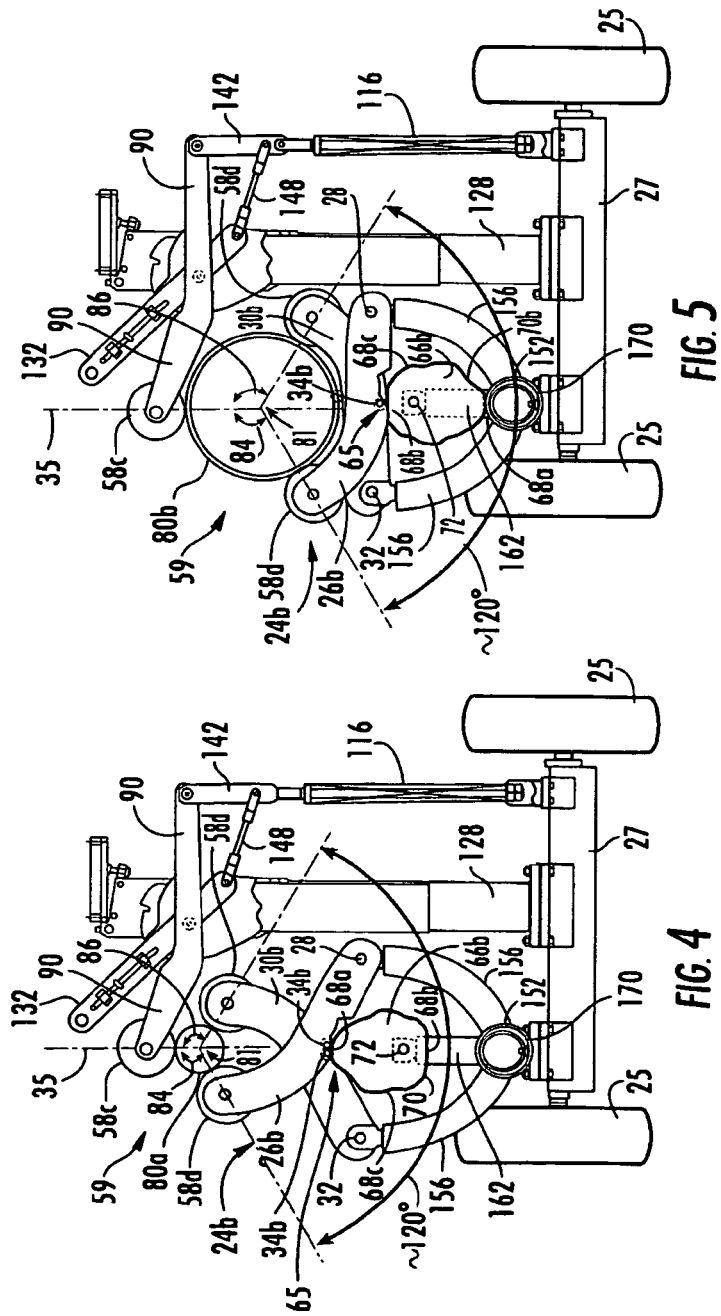

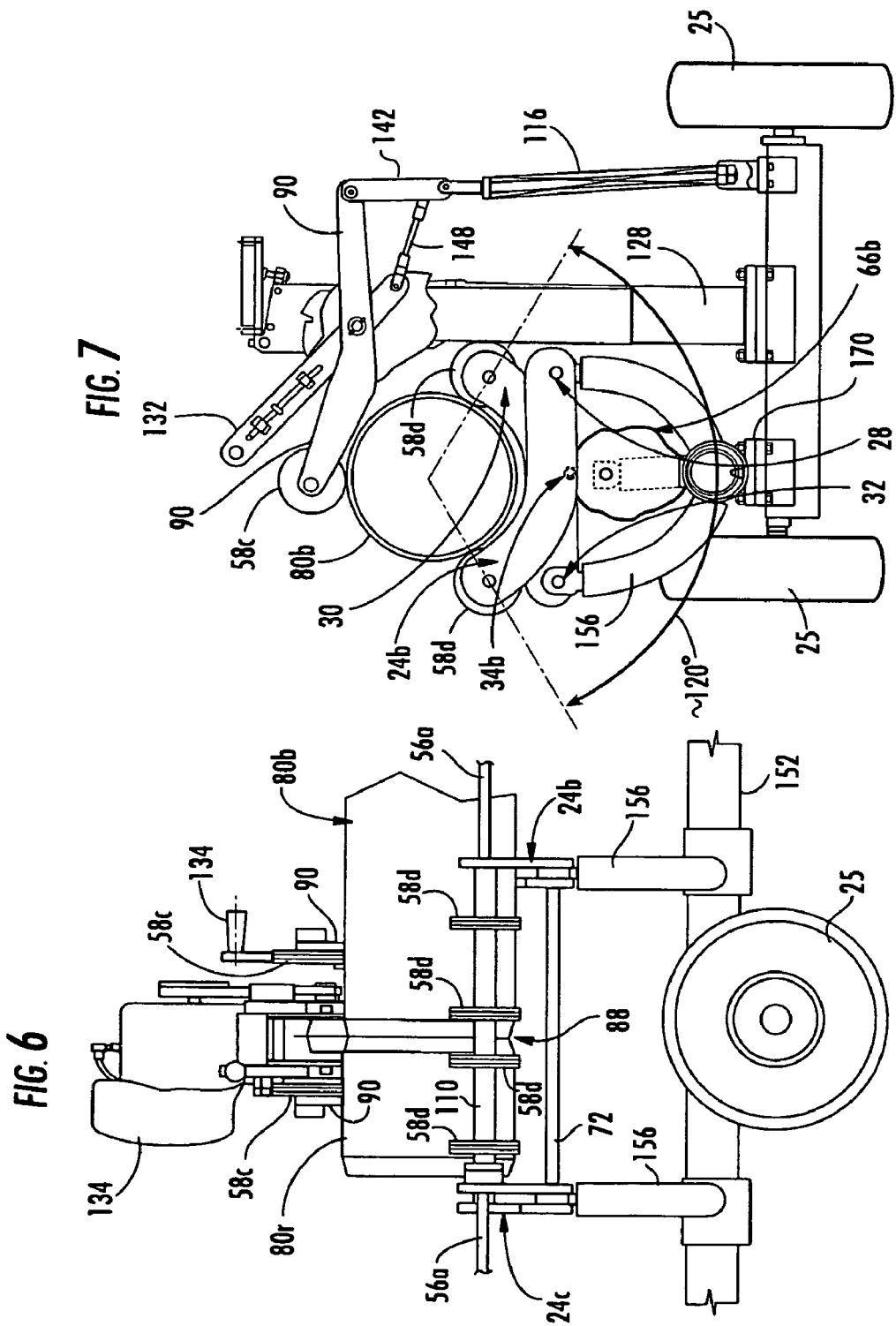

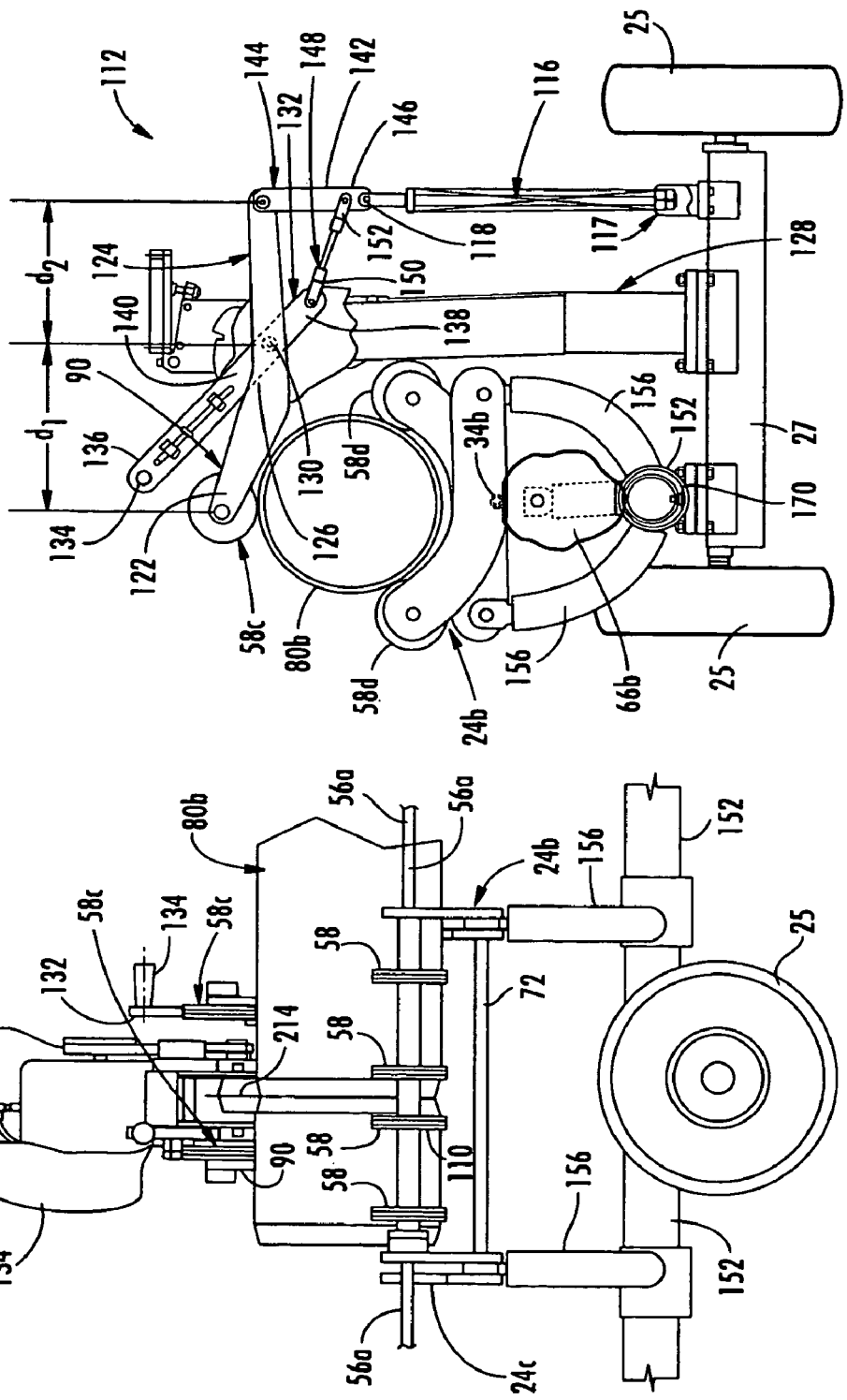

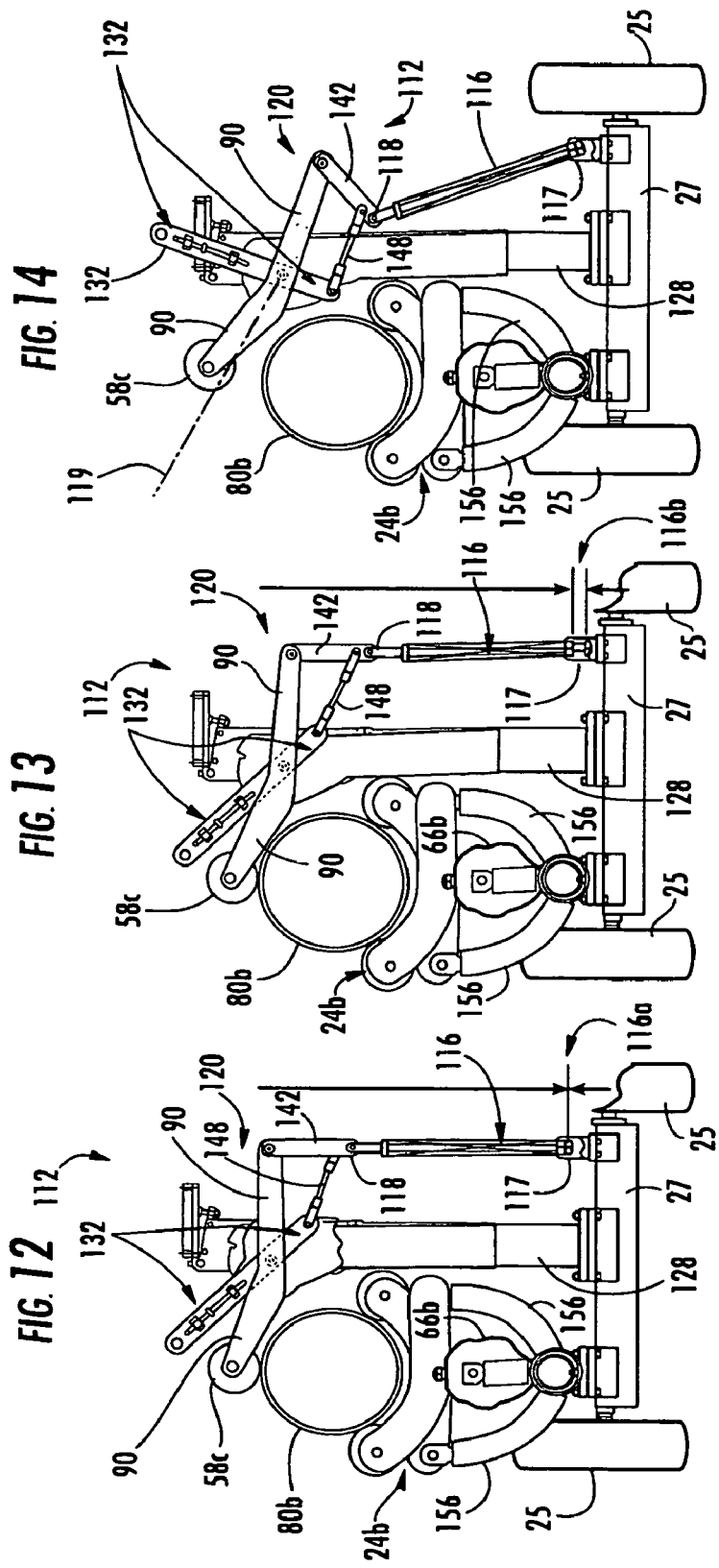

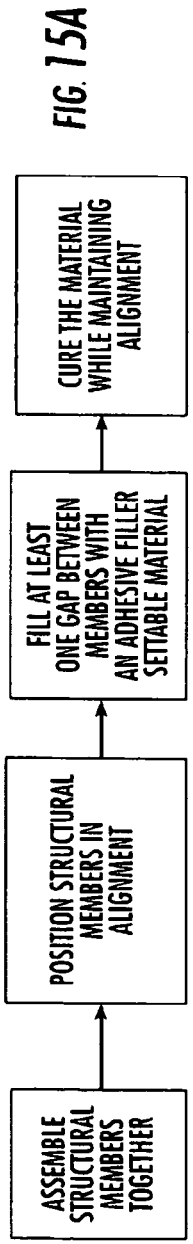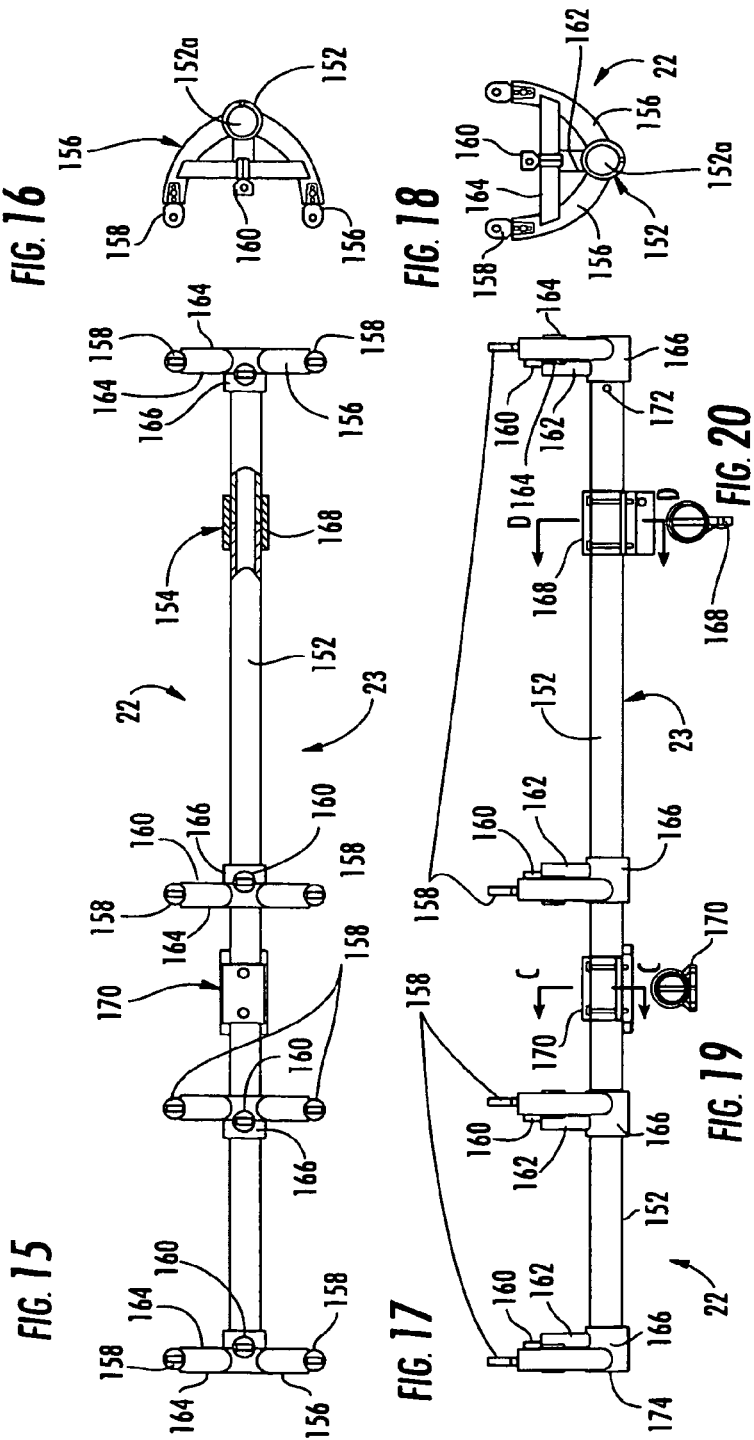

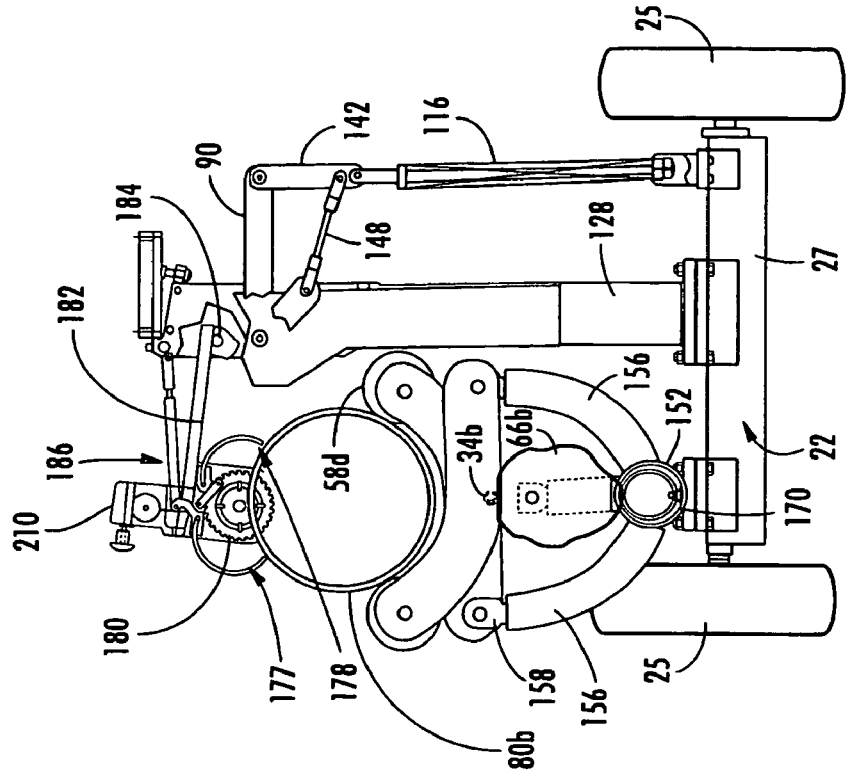
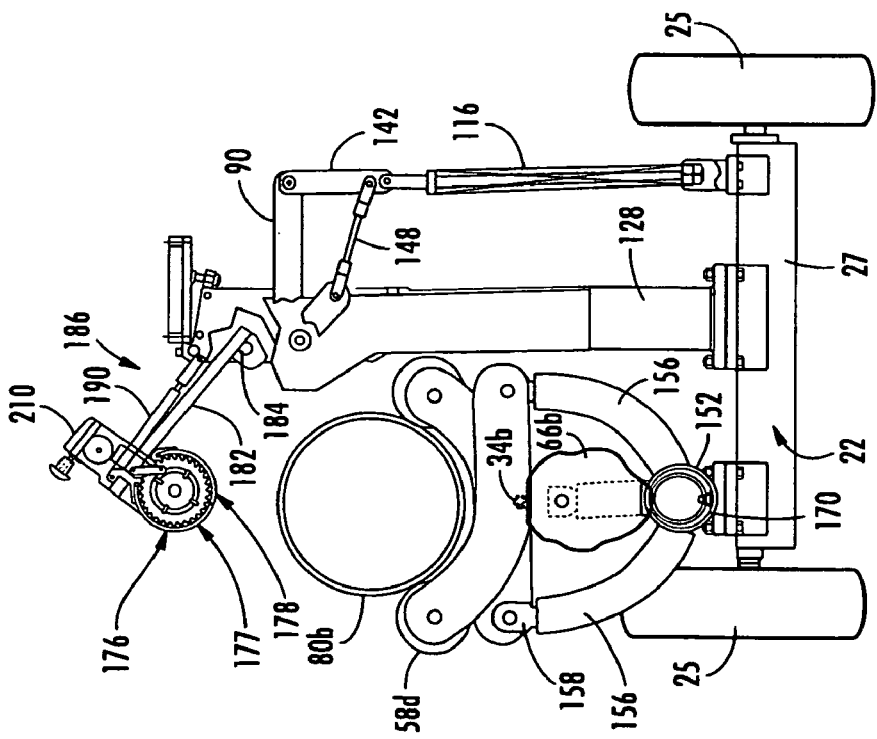

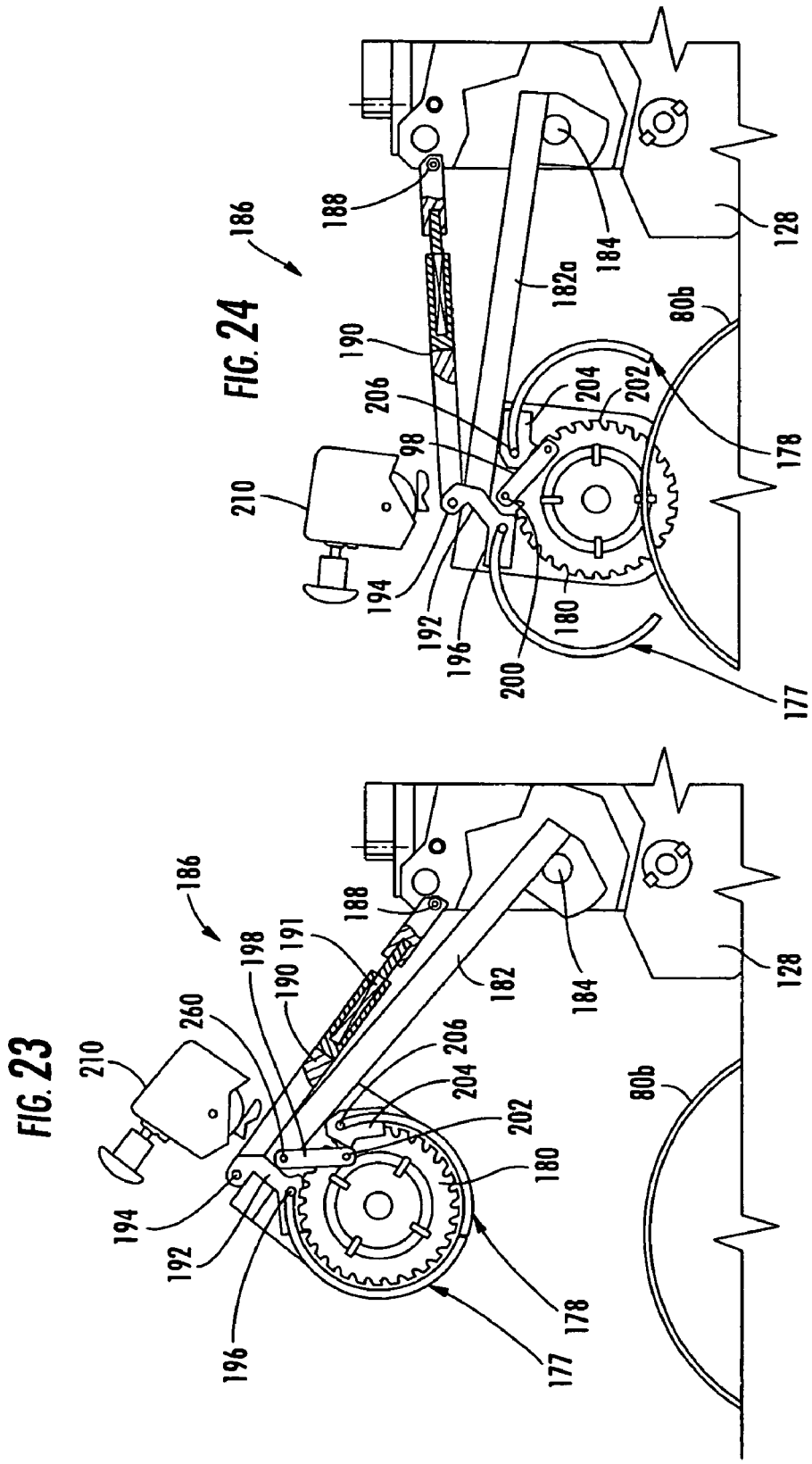

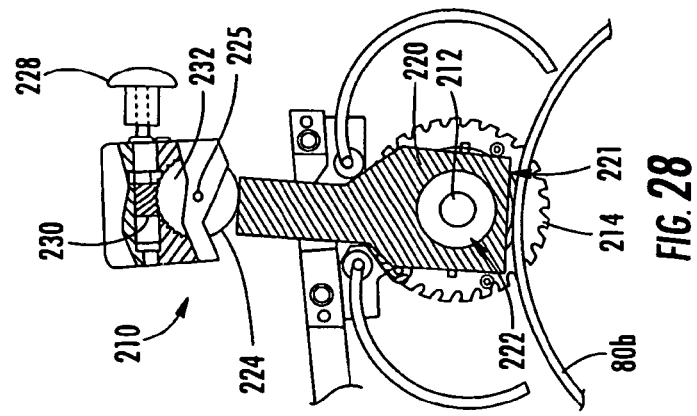
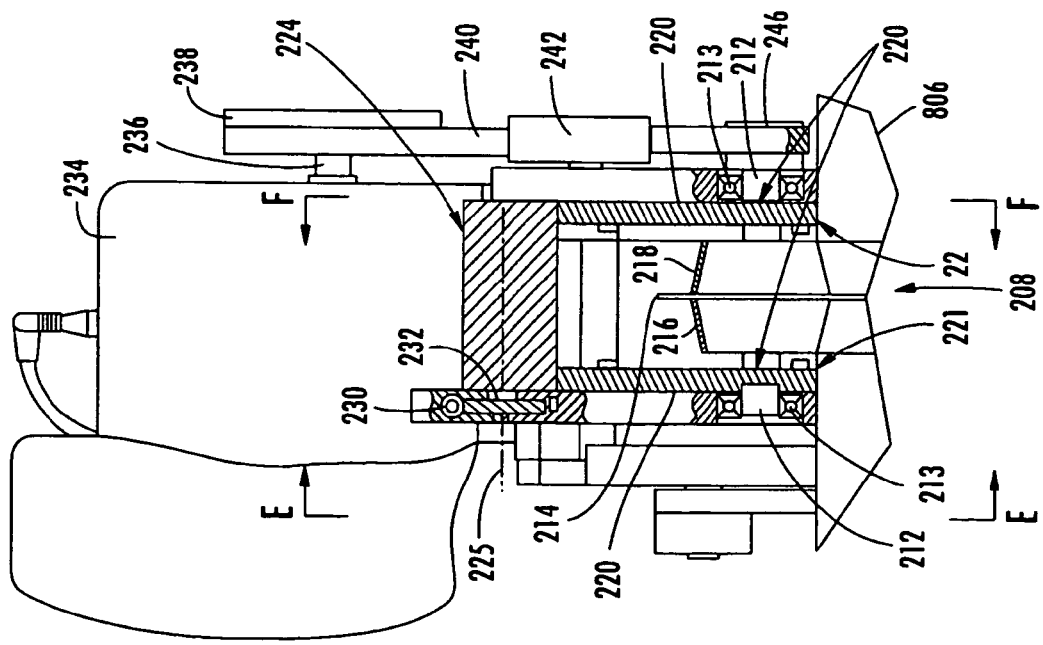

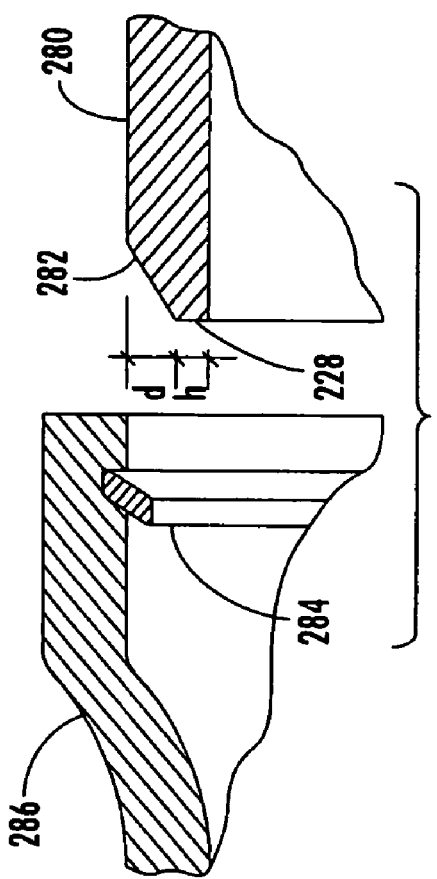
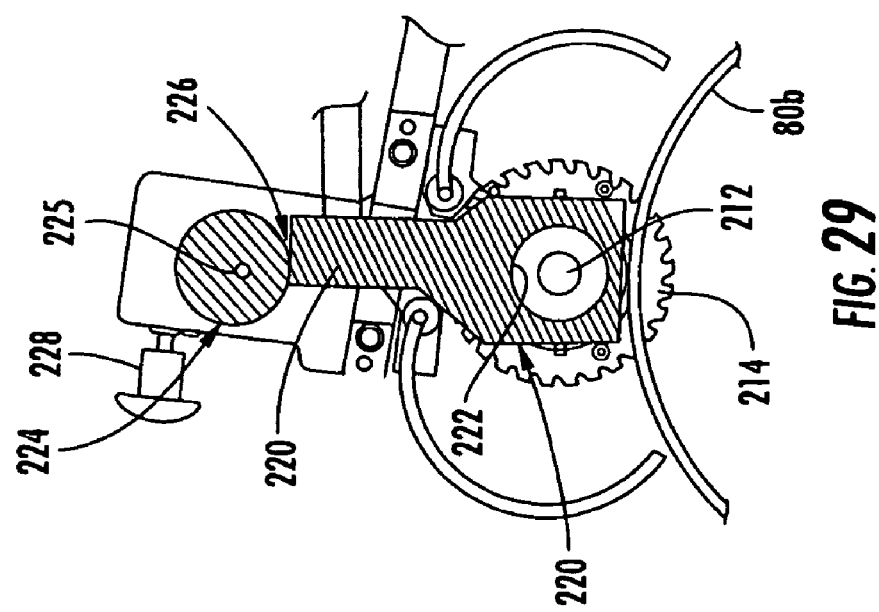
FIG. 29A
FIG. 29

PIPE CUTTING APPARATUS AND METHOD

CROSS REFERENCE TO RELATED APPLICATIONS

This is a divisional of and claims priority of application Ser. No. 11/196,177 filed Aug. 3, 2005 now U.S. Pat. No. 7,624,663 the disclosure of which is hereby incorporated herein by reference.

BACKGROUND OF THE INVENTION

1. Field of the Invention

The present invention relates to a pipe cutting apparatus and, more specifically, to an apparatus for cutting a water or sewer pipe and methods of manufacturing such apparatus.

2. Description of the Related Art

When installing a water or sewer line, or other similar piping system, it is common to use pipes manufactured of a polymeric material, e.g., polyvinyl chloride (PVC), wherein one end of the pipe is a female end defining a socket and the other end of the pipe is a male end having a beveled outer circumference. The pipes are typically manufactured in standard diameters and lengths and several of the pipes may require cutting in the field to provide pipes having the necessary length.

Typically a rubber gasket is used to seal the joint where two pipes are connected. The gasket is captured within an annular pocket formed on the female end of one of the pipes. The male end of the other pipe engages the radially inner surface of the gasket to form the seal. The male end of a standard length pipe will typically include a taper or bevel so that the gasket is not rolled out of the pocket or damaged when the male end is inserted during the installation process. When a pipe must be cut to a custom length in the field, the original beveled male end is typically cut off and a new male end is formed. Workers will often try to bevel the edge of the male end of such custom length pipes in the field to avoid damage to the gasket. The use of hand held cutting or grinding tools, however, will often result in an irregular beveled edge.

After the pipe system has been installed, governmental requirements often require that the system be pressurized and satisfy specific pressure decay parameters. If the system does not pass the pressurization test, the leaks causing such failure must be found and corrected. Oftentimes, the source of such leaks is a damaged or displaced gasket at the junction of two pipes. The cost of finding and repairing such leaks can be very significant. Accordingly, a reduction of the frequency of such leaks is highly desirable.

SUMMARY OF THE INVENTION

The present invention provides a rugged pipe cutting apparatus that securely holds a pipe for working the pipe in a safe and controlled manner and which can be used to cleanly and precisely cut and bevel pipes.

The invention comprises, in one form thereof, an apparatus for cutting a substantially cylindrical pipe. The apparatus includes a structural frame that includes a support arm assembly. The support arm assembly includes first and second support arms. The first and second support arms are each pivotally mounted to the frame and thereby define a first pivot axis and a second pivot axis respectively. The first and second support arms each include an engagement feature. The apparatus also includes a camming assembly that has at least one camming member. The at least one camming member is engaged with each of the engagement features of the first and second support arms wherein movement of the camming assembly simultaneously repositions the engagement features of the first and second support arms and thereby repositions the first and second support arms. A pipe clamping member is also moveably mounted on the frame. Adjustment of the camming assembly defines a plurality of positions of the first and second support arms with the plurality of positions corresponding to a plurality of different pipe diameters wherein a plurality of pipes having different diameters are supportingly engageable between the support arm assembly and the pipe clamping member with the support arm assembly and the pipe clamping member being engageable with the plurality of pipes having different diameters at points substantially equally circumferentially spaced about an outer circumference of the plurality of pipes by adjustment of the camming assembly to selectively reposition the first and second support arms.

The present invention comprises, in another form thereof, an apparatus for cutting a substantially cylindrical pipe. The apparatus includes a structural frame for supporting the pipe and a clamping assembly for clamping the pipe in a secured position on the support assembly. The clamping assembly includes a lever arm pivotally mounted to the frame. A clamping member is disposed on the lever arm and pivoting motion of the lever arm moves the clamping member between a clamping position in which the clamping member engageably secures the pipe on the frame and a disengaged position in which the clamping member is spaced apart from the pipe on the frame allowing movement of the pipe. A biasing member having a first end secured relative to the frame and a second end operably coupled to the lever arm biases the clamping member toward the pipe when the clamping member is positioned proximate the clamping position and biases the clamping member away from the pipe when the clamping member is positioned proximate the disengaged position.

The present invention comprises, in yet another form thereof, an apparatus for cutting a substantially cylindrical pipe. The apparatus includes a structural frame for supporting the pipe, a tool arm pivotally mounted to the frame at a tool arm pivot location and a tool for working the pipe. The tool is disposed on the tool arm and pivotal movement of the tool arm moves the tool between a working position wherein the tool is engageable with the pipe located on the frame and a disengaged position spaced apart from the pipe located on the frame. The apparatus also includes a tool guard assembly. The tool guard assembly includes at least two shielding members that are pivotally mounted to the tool arm. The shielding members have a closed position substantially enclosing the tool and an open position permitting the tool to engage the pipe. A linkage assembly is operably coupled to the shield members. The linkage assembly is also pivotally engaged to the frame at a guard assembly pivot location that is spaced from the tool arm pivot location. The linkage assembly biases the shielding members into their open position when the tool is disposed in its working position and biases the shielding members into their closed position when the tool is disposed in its disengaged position.

The invention comprises, in still another form thereof, an apparatus for cutting a substantially cylindrical pipe. The apparatus includes a structural frame for supporting the pipe, a tool arm pivotally mounted to the frame and a cutting assembly mounted on the tool arm. The cutting assembly includes a shaft rotatably supported on the tool arm and having adjacently mounted thereon at least one beveling blade and a cutting blade. A depth adjusting assembly is also disposed on the tool arm and includes a camming member and at least one positioning member. The positioning member is adapted to engage the pipe and thereby define a distance between the pipe and the cutting assembly shaft. The camming member is engaged with the positioning member wherein adjustment of the camming member selectively adjusts the positioning member relative to the cutting assembly shaft and thereby adjusts the distance between the pipe and the cutting assembly shaft.

The present invention comprises, in another form thereof, an apparatus for cutting a substantially cylindrical pipe. The apparatus includes a structural frame for supporting the pipe and a tool arm mounted to the frame. The tool arm is pivotal between a first position and a second position and defines a pivot axis. A rotatably driven tool is disposed on the tool arm. A motor is fixed to the frame and includes a driveshaft driven by operation of the motor. A flexible member forming a loop is provided. First and second idler pulleys are rotatably disposed on the frame with each of the idler pulleys defining a pulley axis having a fixed location on the frame. The flexible member forming a loop rotatably engages each of the first and second idler pulleys and operably couples the driveshaft and the rotatably driven tool wherein operation of the motor drives the rotatably drive tool through the flexible member. The driveshaft, the first and second idler pulleys and the rotatably driven tool define a loop having a substantially constant length as the tool arm is pivoted between the first and second positions.

The present invention comprises, in still another form thereof, a method of manufacturing an apparatus for cutting a substantially cylindrical pipe. The method includes providing a plurality of structural members wherein at least one of the structural members has an at least partially hollow interior. The plurality of structural members are joined together to form a frame. The method also includes positioning the joined structural members in alignment, filling the hollow interior of the at least one structural member with a settable material in a flowable condition while holding the joined structural members in alignment, curing the settable material to form a unified rigid mass while the structural members are positioned in alignment, and attaching a tool for working the pipe to the frame.

An advantage of the present invention is that by securely clamping the pipe it can reduce imprecision in the cutting and beveling of the pipe caused by warping in the pipe or slippage of a wet pipe. Features of the present invention that facilitate the secure clamping of the pipe, individually and in combination, include the use of a substantially equally-spaced three point support system, a clamping member with a biasing member and a strong and rigid frame formed by filling hollow structural members with a settable material that has cured into a rigid mass of material.

Another advantage of the present invention is that provides a two-part tool shield to enhance the safety of the apparatus.

Yet another advantage of the present invention is that it provides a power transmission system that transfers power from a motor mounted on a stationary frame to a pipe working tool mounted on a pivotal tool arm which does not require the use of multiple belts or a belt tensioning device.

Still another advantage of the present invention is that it provides a depth adjusting assembly that can be used to controllably adjust the depth of a bevel being formed in a pipe.

BRIEF DESCRIPTION OF THE DRAWINGS

The above mentioned and other advantages and features of this invention, and the manner of attaining them, will become more apparent and the invention itself will be better understood by reference to the following description of an embodiment of the invention taken in conjunction with the accompanying drawings, wherein:

FIG. 1 is an end view of an apparatus in accordance with the present invention.

FIG. 2 is a side view of the apparatus.

FIG. 3 is a top view of the apparatus.

FIG. 4 is a cross sectional view taken along line A-A of FIG. 3 of a portion of the apparatus supporting a small diameter pipe.

FIG. 4A is a top view of a portion of the support arm assembly of FIG. 4.

FIG. 5 is a cross sectional view taken along line A-A of FIG. 3 of a portion of the apparatus supporting a large diameter pipe.

FIG. 5A is a top view of a portion of the support arm assembly of FIG. 5.

FIG. 6 is a side view of a portion of the apparatus supporting a pipe.

FIG. 7 is another cross sectional view taken along line A-A of a portion of the apparatus supporting a pipe.

FIG. 10 is a side view of a portion of the apparatus showing the pipe clamping assembly.

FIG. 11 is a cross sectional view taken along line A-A of FIG. 3 of a portion of the apparatus showing the pipe clamping assembly.

FIG. 12 is a cross sectional view taken along line A-A of a portion of the apparatus holding a thin walled pipe.

FIG. 13 is a cross sectional view taken along line A-A of a portion of the apparatus holding a thick walled pipe.

FIG. 14 is a cross sectional view taken along line A-A of a portion of the apparatus showing the clamping assembly in an open position.

FIG. 15 is a partially cut-away top view of the apparatus frame.

FIG. 15A is a flowchart showing a method of manufacturing a frame for the apparatus.

FIG. 16 is an end view of a frame member.

FIG. 17 is a side view of the apparatus frame.

FIG. 18 is an end view of a frame member.

FIG. 19 is a sectional view taken along line C-C of FIG. 17 of a portion of the frame.

FIG. 20 is a sectional view taken along line D-D of FIG. 17 of another portion of the frame.

FIG. 21 is a cross sectional view taken along line A-A of a portion of the apparatus showing the tool guard in a closed position.

FIG. 22 is a cross sectional view taken along line A-A of a portion of the apparatus showing the tool guard in an open position.

FIG. 23 is a detail view of the tool arm with the tool guard in a closed position.

FIG. 24 is a detail view of the tool arm with the tool guard in an open position.

FIG. 27 is a detail partially cut away side view showing the depth adjusting assembly.

FIG. 28 is a detail partially cut away end view showing the depth adjusting assembly looking the direction of line E-E of FIG. 27.

FIG. 29 is a detail partially cut away end view showing the depth adjusting assembly looking in the direction of line F-F of FIG. 27.

FIG. 29A is a cross sectional view of a portion of a male and female end of two sewer pipes.

FIG. 32 is a cross sectional view taken along line A-A of a portion of the apparatus showing the lever arm in a raised position.

FIG. 33 is a cross sectional view taken along line A-A of a portion of the apparatus showing the lever arm in a lowered position for clamping a pipe.

Figure 9:
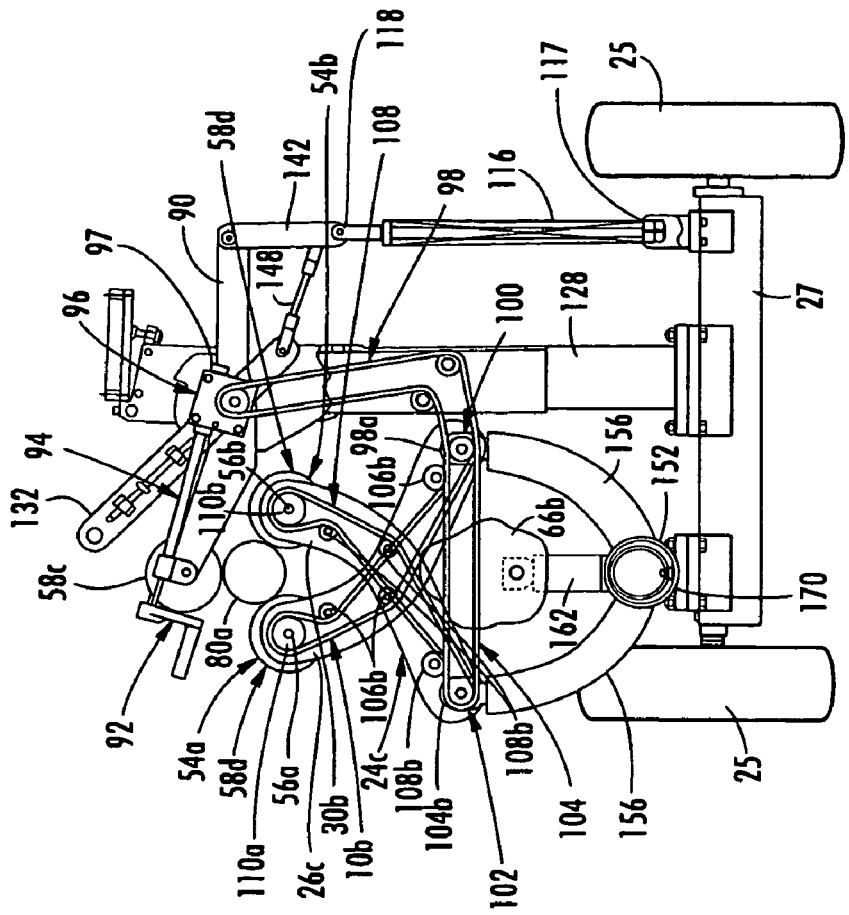
FIG. 9 is a cut-away cross sectional view taken along line B-B of FIG. 8 of a portion of the apparatus showing the roller chain drive.

Individual parts and components may be omitted or partially cut away in the individual figures for purposes of more clearly illustrating the invention and its mode of operation. Corresponding reference characters indicate corresponding parts throughout the several views. Although the exemplification set out herein illustrates the invention in one form, the embodiment disclosed below is not intended to be exhaustive or to be construed as limiting the scope of the invention to the precise form disclosed.

DETAILED DESCRIPTION OF THE INVENTION

An overall view of a pipe cutting apparatus 20 in accordance with the present invention is shown in FIGS. 1-3. The illustrated pipe cutting apparatus, or pipe cutter, 20 has a structural frame 22 including a main beam 152 having pairs of bent arms 156 attached thereto at spaced locations along the length of main beam 152. Frame 22 also includes a lateral member 27 formed by the axle assembly housing and a vertical riser 128.

The frame 22 also includes a series of support arm assemblies 24a-24d which are mounted to bent arms 156. The support arm assemblies 24a-24d are adjustable so that they may be used to support pipes having a variety of different diameters (FIGS. 4 and 5). Support arm assembly 24b is illustrated in FIGS. 4 and 5. Support arm assembly 24b includes a first support arm 26b pivotally mounted to a bent arm 156 of frame 22 with a bolt or other fastener that defines a first pivot axis 28. A second support arm 30b is pivotally mounted to a bent arm 156 of frame 22 with a bolt or other fastener that defines a second pivot axis 32.

First and second support arms 26b, 30b each include an engagement feature 34b that is used to reposition the arms. In the illustrated embodiment, the engagement features 34b are rollers attached to their respective arms 26b, 30b with pins 33b (FIGS. 4A and 5A). The engagement features or rollers 34b have a rotatable head that projects toward the other support arm and which is engaged by a camming member 66b to pivot the arms 26b, 30b about their pivot axes 28 and 32 respectively (FIGS. 4A and 5A). The rollers 34b of the first and second support arms 26b, 30b remain engaged with or follow the common camming member 66b as camming members 66a-66d at each of the assemblies 24a-24d are rotated with elongate rod member 72 of camming assembly 65 such that the respective arms 26b and 30b at each of the assemblies 24a-24d are pivoted about their pivot axes 28, 32 respectively and as discussed in greater detail below. The pivotal attachment of the support arms to frame 22 is relatively inexpensive and is well suited for use on a construction site where contamination with grit and grime can be expected.

Additional pairs of support arm assemblies 24a, 24c and 24d are mounted to frame 22 along the length of main beam 152. Each of the support arm assemblies have a generally similar construction and similar reference numbers represent similar parts thereof with different letter suffixes representing different locations on the apparatus and redundant descriptions have been omitted.

Two roller assemblies 54a, 54b are provided for directly supporting the pipe being cut and extend between and are each mounted on the respective support arms 26a-d, 30a-d opposite the pivot axes 28 and 32 at the distal ends of support arms 26a-26d, 30a-30d (FIG. 3). Roller assemblies 54a, 54b include driven rollers 58d and non-driven rollers or followers 58f. The driven rollers 58d are mounted on a drive sleeve 110 located between support arm assemblies 24b and 24c, while the followers 58f are mounted on rods 56a, 56b that extend the length of the apparatus and through the center of sleeve 110. Non-driven rollers/followers 58f are located between support arm assemblies 24a and 24b and between assemblies 24c and 24d. The rollers 58d, 58f located on drive sleeve 110 and rods 56a, 56b respectively directly engage and support a pipe 80.

Non-driven rollers 58c are mounted on lever arms 90 where, together with lever arms 90, they form a pipe clamping member 59 (FIGS. 4 and 5). As discussed in greater detail below, lever arms 90 are pivotally mounted to frame 22 and move rollers 58c into and out of engagement with a pipe 80 resting on the support arm assemblies 24a-d. FIGS. 4 and 5 both show rollers 58c in a clamping position with rollers 58c engaged with a pipe 80 proximate the vertical support axis 35 and resting on rollers 58d and 58f. FIG. 14 shows rollers 58c and lever arms 90 in a disengaged position. Rollers 58c engage the pipe proximate vertical support axis 35 as can be seen in both FIGS. 4 and 5. This holds true for both small and large diameter pipes because the support arm assemblies 24a-24d hold a smaller diameter pipe at a more elevated position than a larger diameter pipe so that rollers 58c will contact all sizes of pipe within a relatively limited vertical range. That is, as discussed herein below, support arm assemblies 24a-24d hold pipes 80 at an elevated position relative to the pipe diameter so that rollers 58c will contact the pipe within a relatively limited vertical range.

As best seen in FIGS. 4 and 5, the support arm assemblies 24a-24d are selectively repositionable to provide support for differently sized pipes 80. Water and sewer pipes come in standard nominal sizes, e.g., 4, 6, and 8 inch diameters and the camming assembly 65 is used to position the support arm assemblies into different predefined positions, each position being adapted for a different nominal size of pipe.

The camming assembly 65 includes crank and gear assembly 82, connecting rod 72, camming members 66a-66d, and rollers 34a-34d (FIGS. 2-5). Each of the camming members 66a-66d have a plurality of lobes that define discrete camming surfaces, e.g., 68a, 68b, 68c, etc. on the outer circumference 70a-70d of camming members 66a-66d respectively (FIGS. 4 and 5). Camming members 66a-66d are located between the support arms 26 and 30 of each support arm pair 24a-24d, and each roller 34a-34d of each of the support arms 26, 30 projects to the approximate mid-point of the thickness of a respective camming member 66a-66d and is thereby supported on a selected one of camming surfaces 68a, 68b, 68c, etc. (FIGS. 4A and 5A). Camming members 66a-66d thereby define the height of rollers 34a-34d on vertical axis 35.

FIG. 4 illustrates camming members 66a-66d lifting rollers 34a-34d to a relatively high position and thereby pivoting the support arms 26a-d, 30a-d about pivot axes 28, 32 to a position for supporting a relatively small diameter pipe 80a. FIG. 4A shows apparatus 20 in the same position as FIG. 4 and is a view looking downwardly that illustrates rollers 34b extending from support arms 26b, 30b and engaging the top surface of camming member 66b located between arms 26b, 30b. As can be seen in FIGS. 4 and 4A, the rollers 34b are engaged with the same discrete camming surface 68a of camming member 66b and are thus positioned at the same height.

FIG. 5 illustrates camming members 66a-66d lifting rollers 34a-34d to a lesser height and thereby pivoting the support arms 26a-d, 30a-d about pivot axes 28, 32 outwardly and downwardly for supporting a relatively large diameter pipe 80b. FIG. 5A shows apparatus 20 in the same position as FIG. 5 and is a view similar to that of FIG. 4A. As can be seen in FIGS. 5 and 5A, in this configuration, rollers 34b are engaged with a different camming surface 68b of camming member 66b thereby positioning rollers 34b at a lower height.

Camming members 66a-66d are rigidly fixed to a pivotable rod or similar elongate member 72 (FIG. 2). The discrete camming surfaces 68a, 68b, 68c, etc. are located at different distances from rod 72 so that rotation of camming members 66a-66d about the axis of rod 72 displaces rollers 34a-34d to different vertical positions. A manually operated crank and gear assembly 82 (FIG. 2) is coupled to rod 72 and is used to selectively rotate rod 72 about its longitudinal axis. Camming members 66a-66d are radially aligned on rod 72 and are configured so that the different vertical positions of rollers 34a-34d resulting from engagement of rollers 34a-34d with camming surfaces 68a, 68b, 68c, etc., correspond to standard pipe diameters.

All of the support arm assemblies 24a-d are thus moved together when adjusting the assemblies to support a different sized pipe. The simultaneous adjustment of the support arm assemblies 24a-d is accomplished by using rod 72 to join all of the camming members 66a-66d so that they are radially aligned and simultaneously rotated. Each of the camming members 66a-66d have the same shape and dimensions. By providing each camming members 66a-66d with a common outer circumference and attaching rod 72 at a common location, the simultaneous rotation of camming members 66a-66d about the longitudinal axis of rod 72 by cranking crank and gear assembly 82 simultaneously biases rollers 34a-34d into a predefined vertical position and thereby pivots the support arm assemblies 24a-d and the roller assemblies 54a, 54b into the desired position.

The pivoting motion of the support arm assemblies 24a-d positions roller assemblies 54a, 54b so that they respectively define points of contact with the pipe that are substantially equally circumferentially spaced about the outer circumference of the pipe. As shown in FIGS. 4 and 5, rollers 58d, 58f on assemblies 54a, 54b contact pipes 80a, 80b at locations that form an angle of about 120°. The vertical support axis 35 bisects this angle between the lower rollers and, thus, angles 84 and 86 (defined between rollers 58c and the rollers of assemblies 54a and 54b respectively) are approximately equal since rollers 58c contact the pipe proximate vertical support axis 35. Consequently, in FIGS. 4 and 5, angles 84 and 86 will each also be approximately 120°. Thus, for both of these arrangements the circumferential spacing of rollers 58d, 58f and 58c about the pipe are approximately equal.

It is also noted that the outer diameter of pipes for each nominal size may differ slightly because such pipes are produced with different wall thicknesses, however, such differences should affect the circumferential spacing of the contact between the pipe and the rollers by only a relatively minor amount that would not exceed a few degrees and not materially impact the clamping performance of the apparatus.

Rollers 58d, 58f and 58c securely support a pipe 80 on apparatus 20 to enable the pipe to be accurately cut and beveled. With reference to FIGS. 6 and 7, cut and beveled section 88 of pipe 80b separates the main length of pipe 80b from the remainder 80r that is separated by the cutting operation. As can be seen in FIG. 6, multiple rollers 58d are located on each side of the cut section 88. Although not seen in FIG. 6, four rollers 58d are located in similar positions on roller assembly 54b. Thus, the pipe will be fully supported on both sides of the cut to facilitate a clean cut and dual-sided bevel or, in other words, the beveling of both pipes 80b and 80r at the cut section 88.

Figure 8:
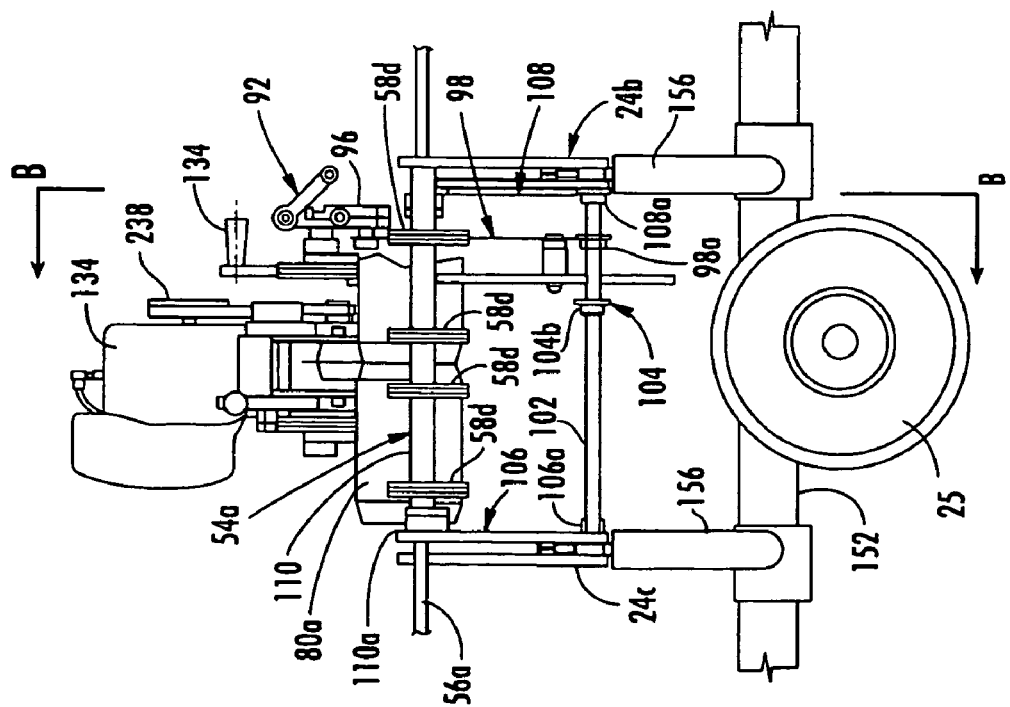
FIG. 8 is a side view of a portion of the apparatus showing the roller chain drive.
Figure 26:
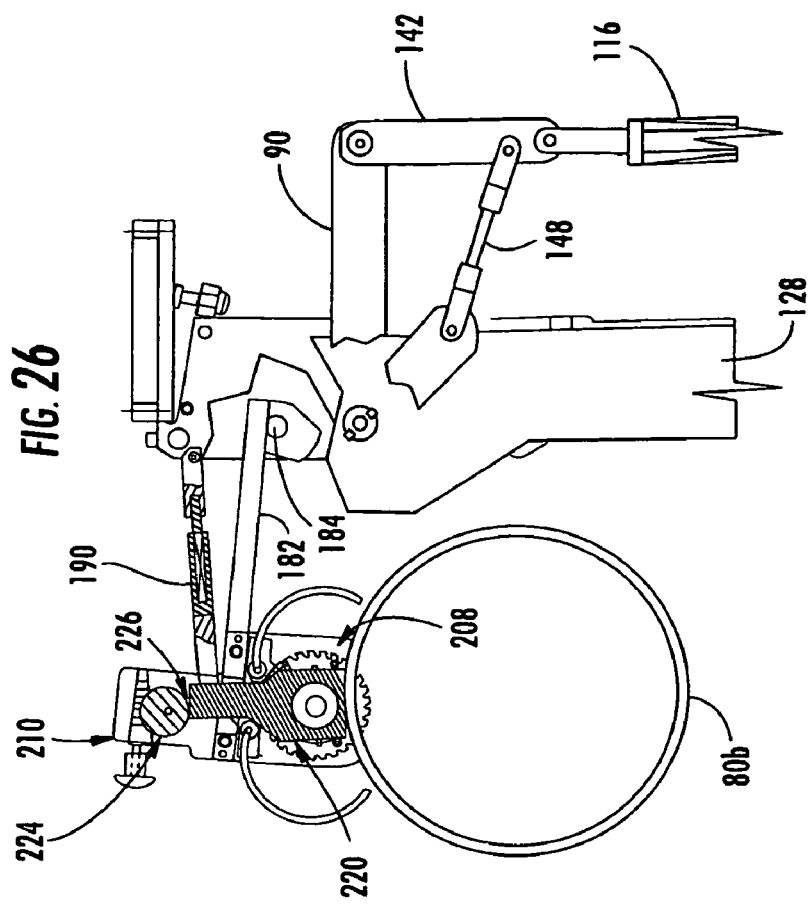
FIG. 26 is a partial view looking along line A-A showing the depth adjusting assembly.
Figure 25:
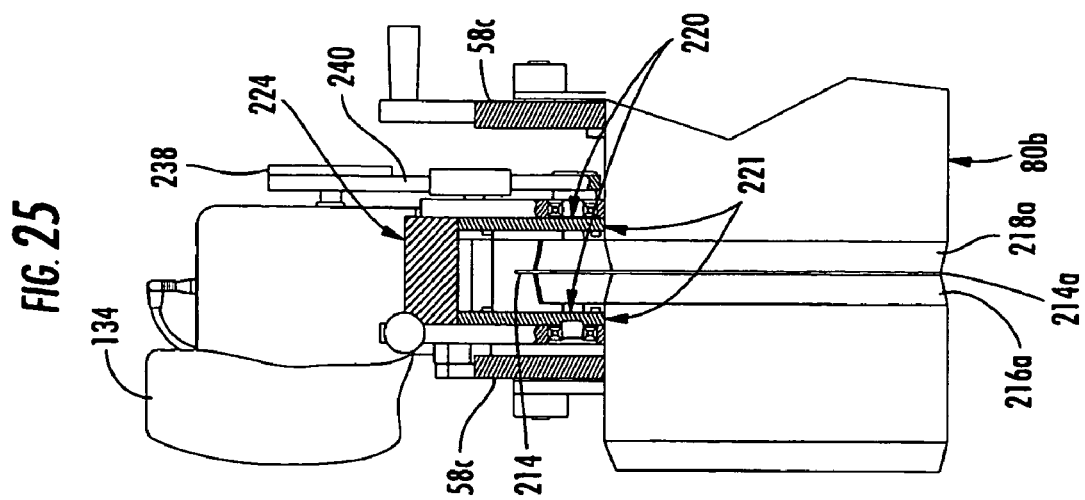
FIG. 25 is a partial side view showing the depth adjusting assembly.

A chain drive is provided to rotate the pipe as the cutting operation takes place and is best understood with reference to FIGS. 8 and 9. To rotate a pipe clamped between the rollers of the apparatus, the operator turns crank 92 which rotates shaft 94. Shaft 94, in turn, rotates, via worm gear drive 96, the drive sprocket 97 (FIG. 9). Power is then transmitted from sprocket 97 through chain 98 to sprocket 98a on shaft 100. Shaft 100 is coupled to and powers shaft 102 through chain 104 and sprocket 104b. The sprocket 104b located on shaft 102 that is engaged by chain 104 is visible in FIG. 8, the corresponding sprocket on shaft 100 is not shown. Power is transferred to the driven rollers 58d on roller assembly 54a between support arm assemblies 24b, 24c by chain 106 which is coupled to shaft 100 via sprocket 106a (FIG. 8) and roller assembly 54a by sprocket 110a. As best seen in FIG. 9, chain 106 also engages idlers 106b mounted on support arm 26c to thereby mount chain 106 on arm 26c. Similarly, chain 108 is coupled to shaft 102 via sprocket 108a to supply the power, via sprocket 110b, necessary to rotate the driven rollers 58d located between support arm assemblies 24b, 24c on roller assembly 54b (FIG. 9). Chain 108 is mounted on support arm 30b by idlers 108b.

In the illustrated embodiment, the rollers 58d located between support arm assemblies 24b, 24c are fixed to drive sleeves 110 which can rotate with respect to rods 56a, 56b (FIG. 3). Thus, the rollers 58d mounted on drive sleeves 110 rotate together with drive sleeves 110 which are driven by the rotation of sprockets 110a and 110b. Rods 56a, 56b respectively concentrically pass through sleeves 110 such that only the four center rollers 58d are driven rollers with the outer rollers 58f mounted directly to rods 56a, 56b being non-driven followers rotatably mounted on rods 56a, 56b. The followers 58f turn with the pipe but do not drive the rotation of the pipe. Alternative embodiments in which all of the rollers are driving rollers or where a different combination of driven rollers and followers are employed may also be used with the current invention. In such alternative embodiments, it is advantageous that at least one driven roller be located on each side of the cutting tool so that as the two sections of pipe are being severed, each pipe section will be drivingly rotated by a roller.

The clamping action of the assembly used to secure the pipe is best understood with reference to FIGS. 10-14. Clamping assembly 112 includes a pair of lever arms 90 on which a clamping roller 58c, or other suitable clamping member, is located for engaging and securing the pipe 80b (FIG.

11). Clamping assembly 112 is shown in a disengaged position in FIG. 14 wherein rollers 58c are spaced apart from the pipe 80b located on the support arm assemblies 24a-24d of frame 22. Pipe 80b can be easily placed on apparatus 20 when rollers 58c and lever arms 90 are in this disengaged position. To secure the pipe on apparatus 20, lever arms 90 and rollers 58c are pivoted into a clamping position, as depicted in FIGS. 10-13. In this clamping position, the pipe is firmly engaged and thereby secured between rollers located on roller assemblies 54a, 54b and lever arms 90. After working the pipe, the lever arms 90 and rollers 58c are once again pivoted to the disengaged position shown in FIG. 14 to remove the pipe sections from apparatus 20.

A biasing member 116 is used to ensure that rollers 58c firmly engage the pipe. In the illustrated embodiment, biasing member 116 is a compression spring that exerts a biasing force urging its opposite ends 117, 118 apart from one another. Compression spring 116 has a first end 117 pivotally secured to the laterally extending axle assembly housing 27 of frame 22 and a second end 118 operably coupled to lever arms 90 and rollers 58c in a toggle relationship by linkage assembly 120. When the lever arms 90 and the center of rollers 58c lie on line 119 shown in FIG. 14, lever arm 90 is at a toggle point defined by linkage assembly 120. When linkage assembly 120 is at the toggle point, the first and second ends 117 and 118 of compression spring 116 define a point of maximum compression such that rotation of lever arm 90 in either direction from the toggle point increases the distance between the first and second ends 117, 118 of compression spring 116. Consequently, compression spring 116 biases lever arms 90 towards the pipe when lever arms 90 are positioned between the pipe and the toggle point and biases lever arms 90 away from the pipe when the lever arms 90 are positioned between the toggle point and the disengaged position. In other words, compression spring 116 biases rollers 58c towards the pipe when they are proximate the clamping position shown in FIGS. 11-13 and away from the pipe when they are proximate the disengaged position shown in FIG. 14.

Lever arms 90 include a first end 122 near which rollers 58c are mounted and an opposite second end 124. In between the first and second ends 122, 124, lever arms 90 include a mediate section 126 that is pivotally mounted to upright 128 of frame 22. Lever arms 90 pivot about a common axis 130. A pair of inner arms 114a are also pivotally mounted to upright 128 of frame 22 so as to pivot about axis 130 and are secured to lever arms 90 via bracing members 114b (FIG. 3). Inner arms 114a pivot as a unit with lever arms 90 and are directly connected to compression springs 116. The two separate lever arms 90 may be joined together by a sleeve running parallel to axis 130 or other suitable means so that both lever arms 90 rotate together as a unit. In alternative embodiments, the two separate lever arms 90 could be separately rotatable.

Linkage assembly 120 also includes an actuating linkage 132 having a first end 136, a second end 138 and a mediate portion 140 located generally centrally between the first and second ends 136, 138 (FIG. 11). Actuating linkage 132 is pivotally mounted to the upright 128 of frame 22 at pivot point 130 in its mediate portion 140 and is pivotal about the same pivot axis as lever arms 90. A manually graspable handle 134 is located proximate the first end 136 of actuating linkage 132 at a location generally above the pipe. By grasping handle 134 an operator can rotate actuating linkage 132 between the positions shown in FIGS. 14 and 13 and thereby move linkage assembly 120, and rollers 58c, between the disengaged and clamping positions.

Linkage assembly 120 also includes a first rigid linkage member 142 joining each lever arm 90 to a compression spring 116. Rigid linkage members 142 each have a first end 144 pivotally connected to a second end 124 of one of the lever arms 90 (FIG. 11). The opposite second end 146 of the first linkage members 142 are pivotally connected to a second end 118 of one of the compression springs 116.

A second rigid linkage member 148 connects a first linkage member 142 to the actuating linkage 132. The second rigid linkage member 148 has a first end 150 pivotally connected to the second end 138 of actuating linkage 132 and an opposite second end 152 pivotally connected to first linkage member 142 at a location between the first and second ends 144, 146 of the first linkage member 142 nearer the second end 146 which is attached to a compression spring 116.

The operation of linkage assembly 120 is best understood with reference to FIGS. 12-14. Compression spring 116 exerts a biasing force urging the first end 117 of spring 116 away from the second end 118 of spring 116. As actuating linkage 132 is pivoted about axis 130, the individual members of linkage assembly 120 are relatively rotated and alter the length of compression spring 116. The point at which compression spring 116 experiences its greatest compression defines a toggle point or angle depicted by line 119 (FIG. 14) of the clamping assembly. Rotation of roller arm and actuating linkage in a counterclockwise direction (when viewed as shown in FIGS. 12-14) from this toggle point/angle moves the lever arms 90 toward the clamping position while clockwise rotation moves the lever arms 90 towards the disengaged position. This toggle point/angle also marks the point or angle at which compression spring 116 transitions from biasing the lever arms 90 toward the clamping position and biasing the lever arms 90 toward the disengaged position as one having ordinary skill in the art will readily understand.

Compression spring 116 exerts an increasingly larger biasing force as it is further compressed. Consequently, lever arms 90, and rollers 58c attached thereto, experience a greater biasing force, either towards the clamping position or toward the disengaged position, the nearer linkage assembly 120 is to toggle point/angle 119. This aspect of the clamping assembly advantageously increases the clamping force used to hold pipes having a greater wall thickness. The position of the support arm assemblies 24a-24d for each standard sized pipe will be known due to the use of camming members 66a-66d. Thus, the location of the upper surface of standard sized pipes can also be determined in advance and the "hold down" or clamping force generated by compression springs 116 can also be determined in advance for standard sized pipes. This hold down force works together with the mechanical wedge defined by rollers 58d, 58f, 58c to tightly hold the pipe and prevent slippage between the pipe and the rollers when pipe is being rotated under the cutting blade. This is particularly advantageous when the pipe is wet. This hold down force also provides a secure grip when the saw blade first begins cutting the pipe and thereby helps prevent the dislodgement of pipe from support arm assemblies 24a-24d. These advantages together with its rugged and reliable construction make the clamping assembly disclosed herein well adapted for use on a construction site.

The use of a strong hold down force is also helpful when working with warped pipes. The cutting of a warped pipe can result in a screw effect wherein the pipe longitudinally shifts as it is being rotated under the cutting blade. Such cuts are unacceptable because the starting and ending point of the cut are not longitudinally aligned. By securely holding the pipe between three equally spaced contact points about the outer circumference of the pipe and at different longitudinal points along the length of the pipe as is done in apparatus 20, the pipe can be at least partially, if not completely, straightened for the cutting operation thereby minimizing or avoiding the screw effect. It can be particularly helpful to hold the pipe on each side of the cut not only to prevent the screw effect but also to enhance the quality of the bevels on the two resulting pipe sections.

Standard sized pipes having the same nominal diameter do not necessarily have the same outer diameter because the pipes are available in different wall thicknesses thereby resulting in different outer diameters. The linkage assembly 120 of the present invention is well adapted for use with pipes having various wall thicknesses. The use of compression springs 116 provides a range of vertical locations in which the top clamping member, e.g., rollers 58c, can be positioned to hold the pipe instead of a single position that must be specifically adjusted for pipes of the same nominal (inner) diameter having different wall thicknesses. This also means that pipes having a greater wall thickness, and thus a larger outer diameter, will generally be engaged by rollers 58c with greater force because rollers 58c and lever arms 90 will be displaced upwardly by pipes having a greater wall thickness and thus be nearer toggle point 119. Exerting a larger hold down force on thicker walled pipes will generally be desirable because such thicker wall pipes will provide greater resistance to the straightening effect of the clamping assembly. Thicker walled pipes will also generally be able to withstand greater hold down forces than thin walled pipes without damage to the pipe.

FIG. 12 illustrates apparatus 20 being used with a thin walled pipe 80t while FIG. 13 illustrates apparatus 20 with a pipe 80b having the same nominal diameter but a thicker wall, and thus larger outer diameter. Compression spring 116 is mounted to frame 22 at its first end 117 such that as compression spring 116 is compressed a rigid central rod (not shown) projects through an opening in a bracket near the bottom of compression spring 116 and thereby compresses a generally helical spring member. In FIG. 12, this rod projects a minimal distance 116a through the bracket while in FIG. 13 this same rod projects a greater distance 116b indicating a greater amount of compression for the spring (and thus larger biasing force) in the configuration depicted in FIG. 13.

Turning to FIG. 11, one additional aspect of the clamping assembly is recognizable, i.e., that horizontal distances $d_1$ and $d_2$ are approximately equal. This configuration is advantageous because it minimizes the bending moments placed on upright or riser section 128 due to the clamping of the pipe.

To assure that pipes held firmly within apparatus 20 are held in a straight position and that the individual components of apparatus 20 work together and on the pipe in the desired manner requires that frame 22 be properly aligned and reliably maintain that alignment in the conditions found on a construction site. To ensure and maintain the proper alignment of frame 22, frame 22 is constructed of generally hollow structural members that are first joined together and then filled with a material that subsequently sets and forms a rigid unified mass providing additional rigidity and strength to frame 22 (FIGS. 15 and 15A).

Frame 22 includes a steel or aluminum tube forming a main beam 152 that is approximately ten feet in length. A pair of bent arms 156 are welded to sleeves 166 which are mounted to main beam 152 at the locations at which support arm assemblies are to be provided. Machined parts 158 are used to support the pivot pins for the support arm assemblies (FIGS. 16-18). Similarly, machined parts 160 support rod 72 which rotates camming members 66a-66d. A riser 162 for each machined part 160 is located near each set of bent arms 156 and is welded to a corresponding sleeve 166. Two cross braces 164 extend between and are welded to each pair bent arms 156 to enhance their strength. The four coupling sleeves 166 are mounted on main beam 152 as descried herein below with each sleeve 166 having a set of bent arms 156 and a riser 162 attached thereto. A coupling assembly or weldment 168 (FIGS. 17 and 20) is attached to main beam 152 near its outermost end and a second coupling assembly 170 (FIGS. 17 and 19) is attached to main beam 152 more proximate its center location. The outer housing of axle assembly 27 is attached to main beam 152 by weldment 170 and a bracing member, not shown, extends from an outboard location on the axle to weldment 168 to further enhance the rigidity of main beam 152. The axle assembly 27 forms a part of frame 22 and includes an axle that rotates within its housing and two wheels 25 located on opposite ends of the axle. A trailer hitch, not shown, may also be attached to frame 22 to allow apparatus 20 to be easily transported between job sites.

After bent arms 156, risers 162 and main beam 152 have been assembled together, machined parts 158, 160 and weldments 168, 170 are aligned using a jig that engages each of the aligned parts and holds each aligned part in a predefined position relative to the other parts. The use of such jigs is well known to those having ordinary skill in the art. The individual frame members are then permanently affixed together by injecting a adhesive material 154, preferably an expanding adhesive filler such as "Rocktite" brand adhesive, between the various contacting surfaces. More particularly, the adhesive material is injected between sleeves 166 and beam 152, coupling assembly 168 and beam 152 and coupling assembly 170 and beam 152. Material 154 is also used for cementing and precisely locating machined parts 158 on the ends of bent arms 156 and parts 160 on the ends of risers 162. The main steps associated with this method of manufacturing the frame are shown in a flowchart in FIG. 15A.

The use of material 154 enhances the strength and rigidity while accurately locating the various components in relation to the main beam 152. This method of manufacture also reduces the required amount of welding thereby reducing the stress and warping of the frame associated with such welding. It can also minimize the number of machining operations and parts required to attain the desired tolerances thereby reducing machining costs.

Apparatus 20 also includes a tool guard assembly 176 that facilitates the safe operation of apparatus 20 and is best understood with reference to FIGS. 21-24. Tool guard assembly 176 includes a first shield member 177 and a second shield member 178. Tool guard assembly is used with tool 180 which both cuts and bevels the pipe. Other tools for working the pipe, however, may also be used with the current invention. Tool 180 and tool guard assembly 176 are both mounted on tool arm 182 which is pivotally mounted to riser 128 of frame 22 at pivot location 184.

As seen in FIGS. 21-24, pivotal movement of tool arm 182 moves tool 180 between a working position (FIGS. 22 and 24) where tool 180 is engageable with the pipe 80b and a disengaged position (FIGS. 21 and 23) where tool 180 is spaced apart from the pipe 80b and thereby allows the pipe to placed on the apparatus or removed from the apparatus.

The first and second shielding members 177, 178 of tool guard assembly 176 define opposite halves of a cylinder and provide an enclosure for the circular cutting and beveling blades of tool 180. Shielding members 177, 178 are formed from a conventional ¼ inch thick shatter resistant transparent polymeric material. When tool arm 182 is in its disengaged position (FIGS. 21 and 23), shielding members 177, 178 are in a closed position substantially enclosing the cutting and beveling blades of tool 180. When tool arm 182 is pivoted downwards to its working position (FIGS. 22 and 24), shielding members 177, 178 are moved into an open position that allows tool 180 to engage the pipe. By utilizing two shielding members 177, 178 that are located on the front and back sides of tool 180 when tool 180 is engaged with the pipe instead of a single shielding member located in front of tool 180 to shield the operator, the present invention provides an improved shielding assembly that not only protects an operator standing in front of the apparatus but also provides protection to other individuals and equipment located on the opposite side of the apparatus. By using a transparent material, the operator can view the progress of tool 180 when working the pipe while simultaneously being protected against flying debris generated by operation of tool 180.

The opening and closing of shield members 177, 178 as tool arm 182 is pivoted between its working and disengaged positions is accomplished using a linkage assembly 186. Linkage assembly 186 includes a first linkage member 190 that is pivotally mounted to riser 128 of frame 22 at pivot location 188. Pivot location 188 is spaced apart from pivot location 184 at which tool arm 182 is pivotally mounted to riser 128 (FIGS. 23 and 24). The opposite end of the first linkage member 190 is coupled to shield members 177, 178 via second linkage member 192 which is pivotally supported on arm 182 at pivot joint 196.

Second linkage member 192 and first linkage member 190 are engaged at pivotal joint 194. First shield member 177 is rigidly fixed to second linkage member 192 and, thus, both first shield member 177 and second linkage member 192 are pivotally mounted to tool arm 182 at pivotal joint 196. Therefore, as tool arm 182 is pivoted and the relative positions of tool arm 182 and first linkage member 190 are changed, second linkage member 192 rotates about pivot joint 196 thereby also pivoting first shielding member 177 with respect to tool arm 182 and tool 180 (FIGS. 23 and 24). Third linkage member 198 is pivotally engaged with second linkage member 192 at pivotal joint 200. The opposite end of third linkage member 198 is pivotally connected, at pivotal joint 202, to a fourth linkage body 204 to which shield member 178 is rigidly affixed. Fourth linkage body 204 and second shield member 178 are pivotally mounted to tool arm 182 at pivotal joint 206. As can be seen in FIGS. 23 and 24, pivotal movement of second linkage member 192 also affects the movement of third linkage member 198 and the pivotal movement of fourth linkage body 204 and second shield member 178 about pivotal joint 206 to thereby move second shield member 178 between its open and closed positions.

As depicted in FIGS. 21-24, first linkage member 190 may include a spring 191 that resists elongation but, with sufficient force, allows linkage member 190 to be elongated as tool arm 182 is pivoted downwardly and after shielding members 177, 178 have opened for thereby relieving any tension that may occur at the end of the stroke. The resistance of member 190 to elongation is greater than the force required to open shielding members 177, 178.

Tool 180 mounted on tool arm 182 includes both a cutting assembly 208 and a depth adjusting assembly 210 as will be discussed with reference to FIGS. 25-29A. The cutting assembly 208 mounted on tool arm 182 includes a shaft 212 that is rotatably supported on tool arm 182 by bearings 213 (FIG. 27). A circular cutting blade 214 is mounted on shaft 212. Also mounted on shaft 212 adjacent opposite sides of blade 214 are a first beveling blade or bit 216 and a second beveling blade 218. When working the pipe, cutting blade 214 completely cuts through the pipe wall leaving cut 214a while bevel blades 216, 218 remove a portion of the pipe wall thickness adjacent cut 214a leaving beveled edges 216a, 218a on opposite sides of cut 214a.

Depth adjusting assembly 210 includes floaters or positioning members 220 located on opposite sides of the cutting instruments 214, 216, 218 and which engage the pipe as it is being cut to define the distance between shaft 212 and the pipe (FIGS. 28 and 29). Positioning members 220 include a small projection 221 that engages and rides on the pipe as the pipe is turned below the positioning members 220. Positioning members 220 also include a large opening 222 that encircles shaft 212 without engaging the shaft and thereby allows the positioning members to move relative to shaft 212. Other configurations of positioning members 220 that do not encircle shaft 212 and, thus, do not require an opening 222 may also be employed with the current invention.

A camming member 224 engages the upper end of positioning members 220 and adjusts the relative position of positioning members 220 and shaft 212 to thereby selectively adjust the depth of bevels 216a and 218a (FIGS. 27-29). In the illustrated embodiment, camming member 224 is generally cylindrical and rotatable about an off-center axis 225. The off-center axis is positioned parallel to cutting assembly shaft 212. Thus, as camming member 224 rotates, the distance between the point of contact 226 between camming member 224 and positioning members 220 and off-center axis 225 changes, thereby also changing the position of positioning members 220 relative to the tool arm 182 and cutting tool shaft 212. Other configurations of camming member 224 that selectively reposition the positioning members 220 may also be employed with the present invention.

A manually operated worm gear 230 is used to selectively rotate camming member 224 and thereby adjust the depth (FIG. 28). The worm gear 230 includes a manually rotatable knob 228 that rotates worm gear 230. Worm gear 230 is engaged with and rotates gear 232 that is fixed to camming member 224 and is rotatable about axis 225 so that camming member 224 is rotated together with gear 232. As known to those having ordinary skill in the art, the depth of the bevel is desirably adjusted depending upon the diameter and wall thickness of the pipe.

As illustrated in FIG. 29A, pipe 280 has been cut with a bevel 282 on its male end. Bevel 282 typically has a depth such that the gasket 284 in pipe 286 encounters only beveled surface 282 as the beveled end of pipe 280 is inserted into the female socket end of pipe 286. Bevel 282 should not, however, be so deep as to form a pointed or sharp edge on the pipe since such a pointed edge can cause damage to the gasket. In other words, the end of pipe 280 should retain an annular flat surface 228. By adjusting the depth "d" of bevel 282, the height "h" of flat surface 288 is also adjusted. As apparatus 20 is used to cut and bevel pipes having different wall thicknesses, the depth of the bevel will likely require adjustment. Depth adjusting assembly 210 provides a convenient mechanism for adjusting the depth of the bevel. Moreover, assembly 210 also provides a uniform bevel depth around the entire circumference of the pipe. The location of positioning members 220 within shielding members 177, 178 also allows positioning members 220 to partially close off open axial ends of shielding members and enhance the shielding of cutting assembly 208.

Figure 30:
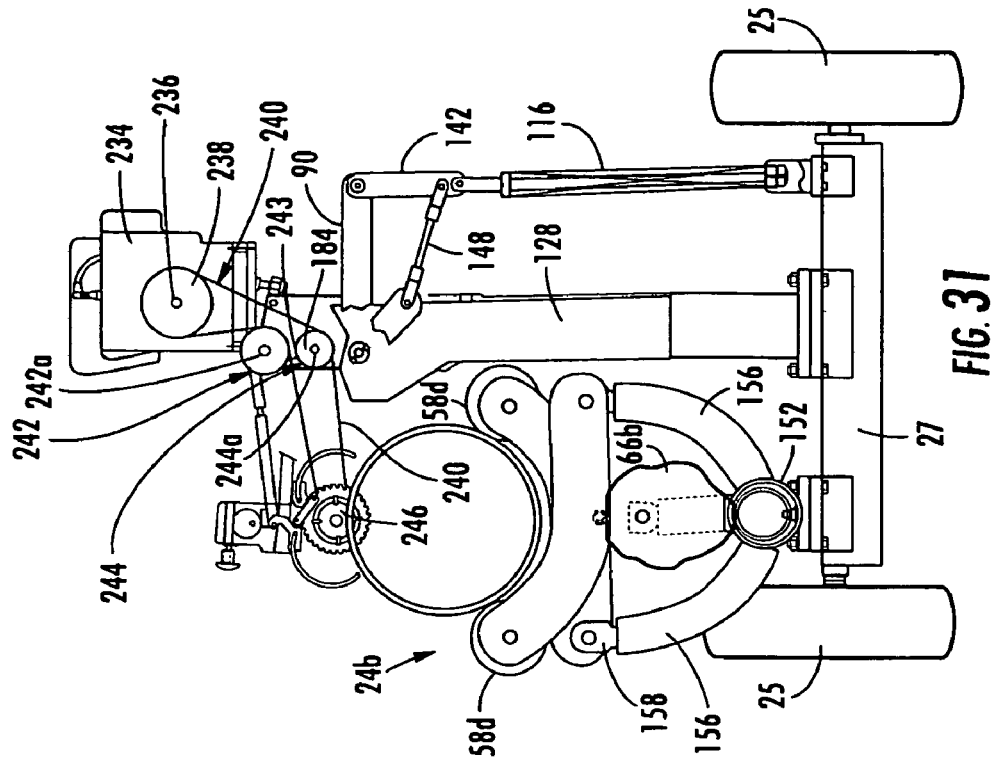
FIG. 30 is a cross sectional view taken along line A-A of a portion of the apparatus showing the power transmission system for the tool with the tool arm in a raised position.
Figure 31:
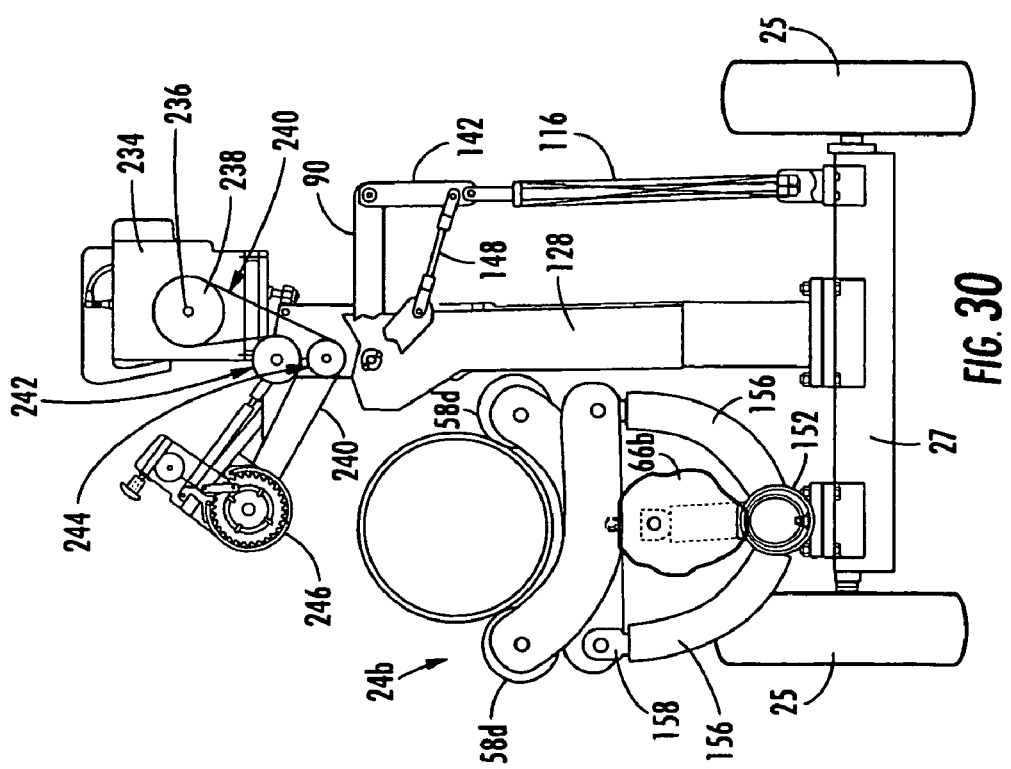
FIG. 31 is a cross sectional view taken along line A-A of a portion of the apparatus showing the power transmission system for the tool with the tool arm in a lowered position.
Figure 34:
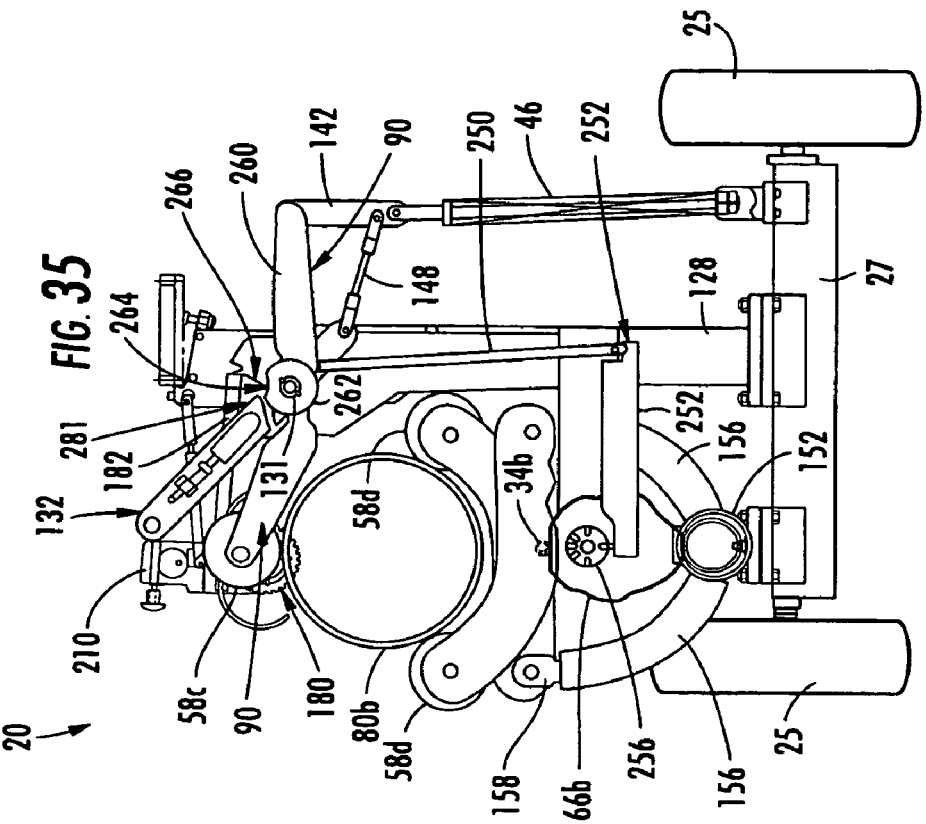
FIG. 34 is a cross sectional view taken along line A-A of a portion of the apparatus showing the lever arm and the tool arm in a raised position.

Tool 180 is rotatably driven by motor 234 and the transmission of power to tool 180 is best understood with reference to FIGS. 30 and 31. As more fully described above, tool arm 182 is pivotal about a pivot axis 184 (FIGS. 23 and 24) between a first disengaged position (FIG. 30) and a second working position (FIG. 31). In the illustrated embodiment, motor 234 is a gasoline-powered internal combustion engine that is mounted on riser 128 of frame 22. Other motors, such as electrical motors, however, may also be employed with the present invention. In the illustrated embodiment, engine 234 includes a horizontal drive shaft 236 on which a driveshaft pulley 238 is fixed (FIGS. 30 and 31). Power is taken off driveshaft 236 via a belt or flexible member 240 that engages pulley 238. Flexible member 240 may be a chain, belt or other suitable looped material having a substantially fixed length. In the illustrated embodiment, member 240 is a belt. In addition to pulley 238, belt 240 also rotatably engages first and second idler pulleys 242, 244 and a driven pulley 246. First and second idler pulleys 242 and 244 are rotatably mounted on riser 128 of frame 22 while driven pulley 246 is mounted on and drives tool shaft 212. The operation of engine 234, thus, drivingly rotates shaft 212 mounted on tool arm 182 through belt 240.

The rotational axes 242a, 244a of pulleys 242, 244 correspond to their centers. Axes 242a, 244a as well as the axis defined by drive shaft 236 remain in fixed positions relative to riser 128. Pulley 246 and the rotational axis defined thereby, however, are pivoted about axis 184 as tool arm 182 is pivoted about the same pivot axis 184. Belt 240 must maintain a relatively constant tension to remain properly engaged with pulleys 238, 242, 244 and 246 as tool arm 182 is pivoted between its disengaged and working positions. A line 243 is shown in FIG. 31 that connects pulley axes 242a, 244a. By positioning idler pulleys 242, 244 proximate line 243, the length of a loop defined substantially solely by driven pulley 246, driveshaft pulley 238 and idler pulleys 242, 244 remains substantially constant as the tool arm 182 is pivoted about pivot axis 184 and between the positions shown in FIGS. 30 and 31. This configuration allows belt 240 to be used to transmit power from engine 234 to shaft 212 without the use of a belt tensioner or other auxiliary device for taking up slack in belt 240 as tool arm 182 is pivoted.

Apparatus 20 includes additional safety features that are best understood with reference to FIGS. 32-35. Lever arms 90 cannot be pulled down into a clamping position unless the camming members 66a-66d adjusting the lower support arms are in the correction position. One of the middle camming members, i.e., camming member 66b, is pictured in FIGS. 32-35. Camming member 66b either includes or is coupled with a disk 256 that defines a series of circumferentially spaced pockets 258 wherein each pocket 258 corresponds to a different one of the discrete camming surfaces 68a, 68b, 68c of the camming member and, thus, also corresponds to a particular standard sized pipe.

Figures 32, 33:
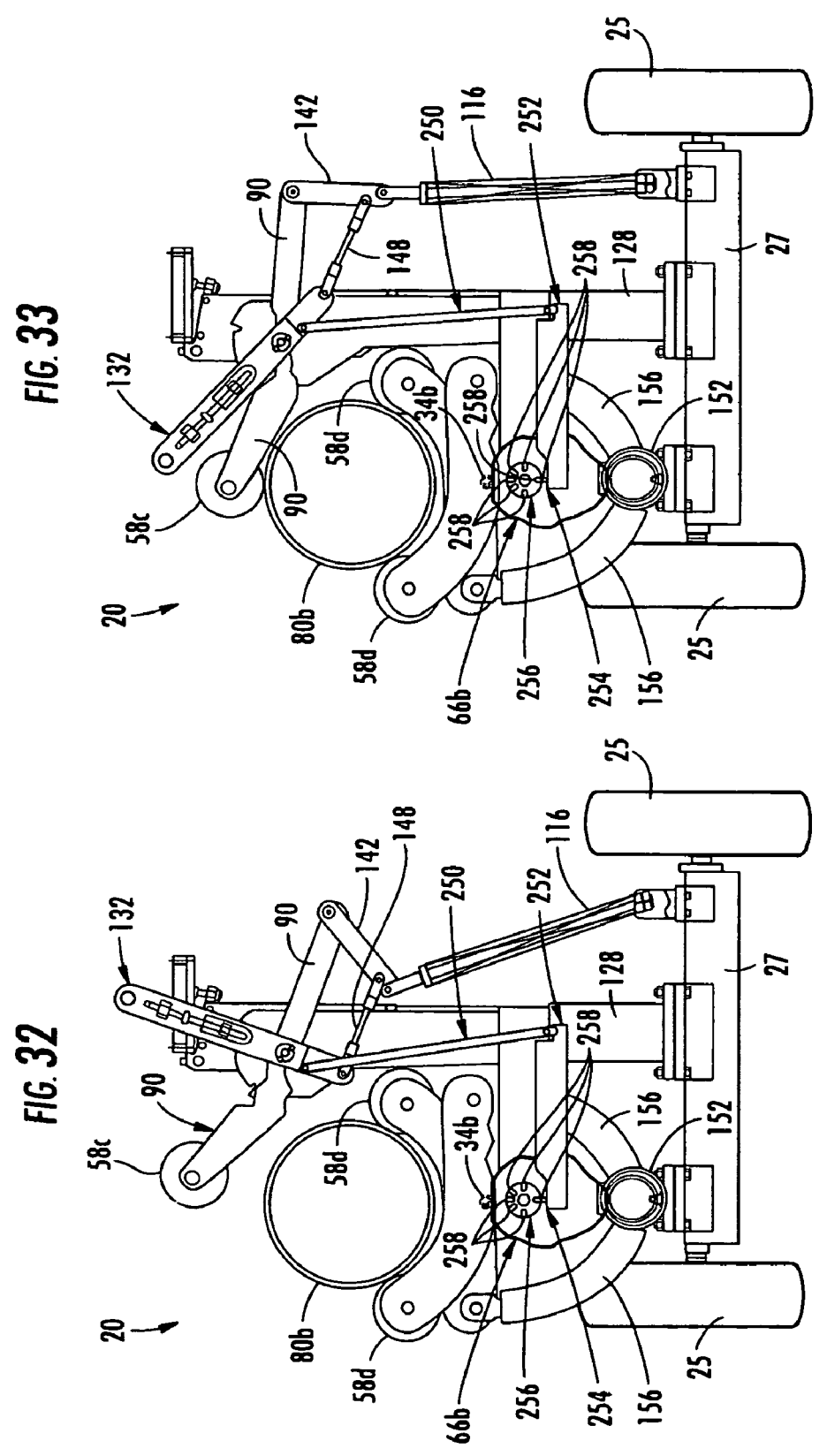

When actuating linkage 132 is pulled to its forward position, wherein the pipe is clamped within apparatus 20 as shown in FIG. 33, link 250 pushes down on lever 252 driving projection 254 into a pocket in disk 256. If the camming members 66, 74, 66m are out of position, projection 254 will not enter one the pockets 258 and actuating linkage 132 will be prevented from being rotated into the clamping position shown in FIG. 33. When the cams 66a-66d are in the correct position, projection 254 will be able to enter a pocket 258 on disk 256. This not only allows actuating linkage 132 and lever arms 90 to be pivoted into their clamping position shown in FIG. 33 but also locks the cams 66a-66d into place.

Figure 35:
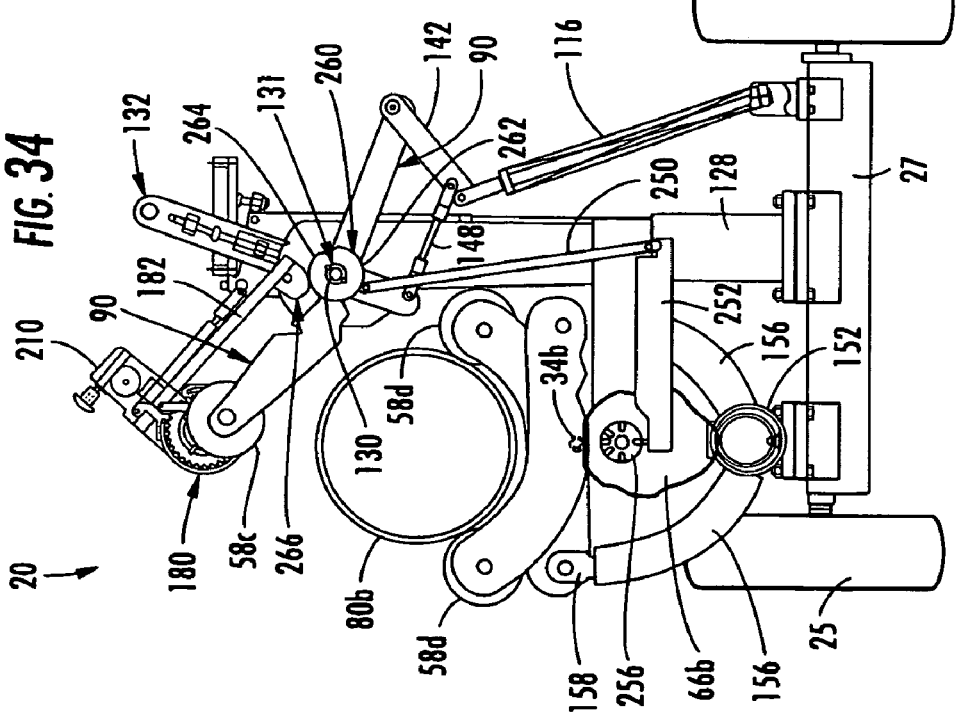
FIG. 35 is a cross sectional view taken along line A-A of a portion of the apparatus showing the lever arm and the tool arm in a lowered position.

Another safety feature prevents tool arm 182 from being pulled down to engage tool 180 with the pipe unless lever arms 90 are in the clamping position shown in FIGS. 33 and 35. This is accomplished with the use of hollow shaft 131 mounted at pivot location 130. An outer disk 260 is keyed to hollow shaft 131 and has an outer circumferential perimeter 262 that includes a scalloped portion 264. Hollow shaft 131 is also keyed to actuating linkage 132 so that disk 260 and scallop 264 rotate with actuating linkage 132. Scallop 264 is shaped to cooperate with projection 266 on tool arm 182.

When actuating linkage 132 is in its disengaged position, scallop 264 is not in a position to engage projection 266 which, instead, rides on the generally circular outer circumference 262. This arrangement prevents tool arm 182 from being rotated downwardly into its working position. After actuating linkage 132 has been rotated into its clamping position depicted in FIG. 35, scallop 264 is positioned to allow projection 266 to enter scallop 264 and thereby allow tool arm 182 to be rotated into a position where tool 180 may engage pipe 80b. The interaction between projection 266 and scallop 264 also requires that tool arm 182 be raised, and tool 180 disengaged from the pipe, before lever arms 90 can be raised into a disengaged position. This assures that the pipe will remain firmly engaged by lever arms 90 during the working of the pipe with tool 180 located on tool arm 182.

While this invention has been described as having an exemplary design, the present invention may be further modified within the spirit and scope of this disclosure. This application is therefore intended to cover any variations, uses, or adaptations of the invention using its general principles.

What is claimed is:

1. An apparatus for cutting a substantially cylindrical pipe, said apparatus comprising: a structural frame for supporting the pipe; a tool arm pivotally mounted to said frame; a cutting assembly mounted on said tool arm, said cutting assembly including a shaft having adjacently mounted thereon at least one beveling blade and a cutting blade; said shaft being rotatably supported on said tool arm; and a depth adjusting assembly disposed on said tool arm including a camming member and at least one positioning member, said positioning member adapted to engage the pipe and thereby define a distance between the pipe and said cutting assembly shaft, said camming member engaged with said positioning member wherein adjustment of said camming member selectively adjusts said positioning member relative to said cutting assembly shaft and the tool arm and thereby adjusts the distance between the pipe and said cutting assembly shaft.

2. The apparatus of claim of claim 1 wherein said camming member is generally cylindrical in shape and rotatable about an off-center axis, said off-center axis being positioned parallel to said shaft.

3. The apparatus of claim 2 wherein said depth adjusting assembly further comprises a manually operated worm gear, said worm gear drivingly coupled to said camming member.

4. The apparatus of claim 3 wherein said positioning member includes a projection engageable with the pipe and said camming member engages said positioning member at an end opposite said projection.

5. The apparatus of claim 1 wherein said at least one positioning member comprises first and second positioning members, said first and second positioning members being adapted to engage the pipe on opposite sides of said cutting blade.

6. An apparatus for cutting a substantially cylindrical pipe, said apparatus comprising: a structural frame for supporting the pipe; a tool arm pivotally mounted to said frame; a cutting assembly mounted on said tool arm, said cutting assembly including a shaft having adjacently mounted thereon at least one beveling blade and a cutting blade; said shaft being rotatably supported on said tool arm; and a depth adjusting assembly disposed on said tool arm including a camming member and at least one positioning member, said positioning member adapted to engage the pipe and thereby define a distance between the pipe and said cutting assembly shaft, said camming member engaged with said positioning member wherein adjustment of said camming member selectively adjusts said positioning member relative to said cutting assembly shaft and thereby adjusts the distance between the pipe and said cutting assembly shaft;

wherein said at least one positioning member comprises first and second positioning members, said first and second positioning members being adapted to engage the pipe on opposite sides of said cutting blade; and, wherein said first and second positioning members each define an opening and said shaft non-engageably extends through said openings in said first and second positioning members.

7. The apparatus of claim 6 wherein said shaft is rotatably supported by first and second bearings, said first positioning member being disposed between said first bearing and said cutting blade and said second positioning member being disposed between said second bearing and said cutting blade.

8. The apparatus of claim 7 wherein said camming member is generally cylindrical in shape and rotatable about an off-center axis, said off-center axis being positioned parallel with said shaft.

9. The apparatus of claim 8 wherein said depth adjusting assembly further comprises a manually operated worm gear, said worm gear drivingly coupled to said camming member.

10. The apparatus of claim 9 wherein each of said first and second positioning members includes a projection engageable with the pipe and said camming member engages each of said first and second positioning members at an end opposite said projections.

11. The apparatus of claim 1 wherein said at least one beveling blade comprises first and second beveling blades, said first and second beveling blades being positioned adjacent opposite sides of said cutting blade.

12. The apparatus of claim 11 wherein said at least one positioning member comprises first and second positioning members, said first and second positioning members being adapted to engage the pipe wherein said cutting blade and said first and second beveling blades are disposed between said first and second positioning members.

13. An apparatus for cutting a substantially cylindrical pipe, said apparatus comprising: a structural frame for supporting the pipe; a tool arm pivotally mounted to said frame; a cutting assembly mounted on said tool arm, said cutting assembly including a shaft having adjacently mounted thereon at least one beveling blade and a cutting blade; said shaft being rotatably supported on said tool arm; and a depth adjusting assembly disposed on said tool arm including a camming member and at least one positioning member, said positioning member adapted to engage the pipe and thereby define a distance between the pipe and said cutting assembly shaft, said camming member engaged with said positioning member wherein adjustment of said camming member selectively adjusts said positioning member relative to said cutting assembly shaft and thereby adjusts the distance between the pipe and said cutting assembly shaft;

wherein said at least one beveling blade comprises first and second beveling blades, said first and second beveling blades being positioned adjacent opposite sides of said cutting blade;

wherein said at least one positioning member comprises first and second positioning members, said first and second positioning members being adapted to engage the pipe wherein said cutting blade and said first and second beveling blades are disposed between said first and second positioning members; and, wherein said first and second positioning members each define an opening and said shaft non-engageably extends through said openings in said first and second positioning members.

14. The apparatus of claim 13 wherein said shaft is rotatably supported by first and second bearings, said first positioning member being disposed between said first bearing and said first beveling blade and said second positioning member being disposed between said second bearing and said second beveling blade.

15. The apparatus of claim 14 wherein said camming member is generally cylindrical in shape and rotatable about an off-center axis, said off-center axis being positioned parallel with said shaft.

16. The apparatus of claim 15 wherein said depth adjusting assembly further comprises a manually operated worm gear, said worm gear drivingly coupled to said camming member.

17. The apparatus of claim 15 wherein each of said first and second positioning members includes a projection engageable with the pipe and said camming member engages each of said first and second positioning members at an end opposite said projections.

\* \* \* \* \*